(12) United States Patent
Kee et al.

(10) Patent No.: US 8,074,678 B2
(45) Date of Patent: Dec. 13, 2011

(54) REVERSIBLE FLOW VALVE ASSEMBLY

(75) Inventors: Kok-Hiong Kee, St. Louis, MO (US); Ruben Huerta-Ochoa, O'Fallon, MO (US); Jinmin Hu, Belleville, IL (US)

(73) Assignee: Emerson Electric Co., St. Louis, MO (US)

( * ) Notice: Subject to any disclaimer, the term of this patent is extended or adjusted under 35 U.S.C. 154(b) by 464 days.

(21) Appl. No.: 12/472,931

(22) Filed: May 27, 2009

(65) Prior Publication Data

US 2010/0301250 A1   Dec. 2, 2010

(51) Int. Cl.
*F16K 17/04* (2006.01)
(52) U.S. Cl. ............... 137/493.8; 251/175; 251/176; 251/208
(58) Field of Classification Search ............ 137/493, 137/493.8; 251/175, 176, 208
See application file for complete search history.

(56) References Cited

U.S. PATENT DOCUMENTS

| 1,751,591 A | 3/1930 | McCloskey | |
|---|---|---|---|
| 3,987,819 A | 10/1976 | Scheuermann | 137/637.3 |
| 4,327,758 A | 5/1982 | Uhlmann | 137/625.17 |
| 4,380,250 A * | 4/1983 | Stoll | 137/556 |
| 4,962,912 A * | 10/1990 | Stoll | 251/208 |
| 5,014,736 A * | 5/1991 | Korfgen et al. | 137/315.13 |
| 5,580,029 A * | 12/1996 | Bjerggaard | 251/121 |
| 5,934,320 A * | 8/1999 | O'Reilly et al. | 137/625.21 |
| 6,619,613 B1 | 9/2003 | Akamatsu et al. | 251/129.04 |
| 7,093,818 B2 | 8/2006 | Koeneman | 251/208 |
| 7,168,677 B2 | 1/2007 | Gama et al. | 251/69 |
| 7,316,384 B2 | 1/2008 | Sekiya et al. | 251/129.11 |
| 7,628,170 B2 * | 12/2009 | Kok-Hiong et al. | 137/601.2 |

* cited by examiner

*Primary Examiner* — John Rivell
*Assistant Examiner* — Ian Paquette
(74) *Attorney, Agent, or Firm* — Harness, Dickey & Pierce, P.L.C.

(57) ABSTRACT

A flow valve is provided that comprises a valve chamber including first and second valve port openings in communication with first and second inlet/outlets. The valve further includes a shaft rotatably disposed in the valve chamber, and a first valve plate rotatably coupled to the shaft that is disposed in the valve chamber over the first valve port opening. The first valve plate has a first tapered slot positioned therein so as to align with the first valve port opening. The first valve plate is configured to rotate from its closed position covering the first valve port opening to an open position, where rotation of the first valve plate adjustably positions a wider or narrower portion of the first tapered slot over the first valve port opening. The valve further includes a second valve plate that is configured to rotate with the first valve plate, and to cover the second valve port opening.

20 Claims, 17 Drawing Sheets

US 8,074,678 B2

REVERSIBLE FLOW VALVE ASSEMBLY

FIELD OF THE INVENTION

The present disclosure relates to flow control valves, and more particularly to motor actuated modulating flow control valves.

BACKGROUND

The statements in this section merely provide background information related to the present disclosure and may not constitute prior art.

In a conventional refrigeration or HVAC system, flow control devices are typically utilized to control the flow of working fluids in a refrigeration system. In general, the refrigeration system would include a compressor that forces the particular refrigerant used in the system through a condensing coil, where the refrigerant vapor liquefies. The liquid refrigerant passes through a thermostatic expansion valve, expanding the high pressure liquid refrigerant to a low pressure vapor. The low pressure, low temperature refrigerant discharged from the thermostatic expansion valve is then directed through an evaporator coil for absorbing heat and thus refrigerating the space inside the container surrounding the evaporator coil.

The thermostatic expansion valve functions to meter the flow of refrigerant into the evaporator coil in proportion to the rate of evaporation of the refrigerant in the evaporator coil, and is responsive to the temperature and pressure of the refrigerant leaving the evaporator coil. In this manner, the thermostatic expansion valve is intended to control flow so that the refrigerant leaves the evaporator coil at a predetermined superheat. Generally, the superheat of the refrigerant is a measure of the heat contained in the refrigerant vapor above its heat content at the boiling point (saturated vapor temperature) at the existing pressure. Maintaining the refrigerant entering the suction line from the evaporator coil at a desired superheat level enhances the refrigeration system performance.

Thermal expansion valves are typically used, in conjunction with a suction regulator, to maintain a consistent evaporator coil pressure. In known systems, conventionally designed mechanical pressure regulators are used for this purpose. Conventional mechanical pressure regulators include a throttling element that, when moved, limits the flow of the refrigerant through the suction regulator to regulate the pressure. A diaphragm, or other sensing element, responds to variations in the inlet pressure and moves the throttling element accordingly. A reference pressure, typically exerted by a spring, is applied to one side of the diaphragm to bias the diaphragm in a desired position, or set point. High side inlet pressure is applied to the other side of the diaphragm to move the diaphragm against the spring, and thus, move the throttling element.

In many refrigeration system implementations, finer temperature control is desirable. Adjusting the setting of conventionally designed mechanical pressure regulators in such thermal expansion valves can be a time consuming, manual process. Moreover, if the refrigerant or desired temperature changes, the complicated process of manually adjusting the pressure regulator's set screw must be repeated.

SUMMARY

This section provides a general summary of the disclosure, and is not a comprehensive disclosure of its full scope or all of its features.

The present disclosure relates to various embodiments of a reversible flow expansion valve that include a valve chamber having a lower wall with a first valve port opening and a second valve port opening therein, in communication with a first inlet/outlet and a second inlet/outlet of the valve, respectively. The various embodiments further include a shaft rotatably disposed in the valve chamber in a generally vertical orientation. A first valve plate is disposed in the valve chamber over the first valve port opening, and is rotatably coupled to the shaft. The first valve plate has at least a first tapered semi-circular slot positioned in the first valve plate so as to align with the first valve port opening. The first valve plate is configured to rotate from a closed position, in which the first valve plate is positioned over the first valve port opening, to an open position in which rotation of the first valve plate adjustably positions a wider or narrower portion of the first tapered semi-circular slot over the first valve port opening, to adjustably vary the rate of fluid flow through the valve. The first valve plate in its closed position is configured to be movable in an axial direction towards and away from the first valve port opening. The reversible flow expansion valve further includes a second valve plate that is configured to rotate with the first valve plate, and to cover the second valve port opening when the first valve plate is rotated to the closed position. The second valve plate in its closed position is also configured to be movable relative to the first valve plate in an axial direction towards and away from the second valve port opening.

In the various embodiments, the first valve plate in its closed position is configured to move away from the first valve port opening, and the second valve plate in the closed position is configured to move against the second valve port opening, to thereby resist fluid flow through the second valve port opening. Similarly, the second valve plate in the closed position is further configured to move away from the second valve port opening, and the first valve plate in the closed position is further configured to move against the first valve port opening, to thereby resist fluid flow through the first valve port opening.

In one aspect of the present disclosure, one embodiment of a reversible flow expansion valve includes a first valve plate that includes a first tapered semi-circular slot positioned therein so as to align with first valve port opening, and a second valve plate surrounding the first valve plate that includes a second tapered semi-circular slot positioned therein so as to align with the second valve port opening. The first and second valve plates are configured to rotate from a closed position to an open position in which rotation of the first and second valve plates adjustably positions a wider or narrower portion of the first and second tapered semi-circular slots over the first and second valve port openings, to adjustably vary the rate of fluid flow therethrough.

In yet another aspect of the present disclosure, one embodiment of a reversible flow expansion valve includes a first valve plate that includes first and second tapered semi-circular slots positioned therein so as to align with first and second valve port openings, and is configured to rotate from a closed position to an open position in which rotation of the first valve plate adjustably positions a wider or narrower portion of the first and second tapered semi-circular slots over the first and second valve port openings, to adjustably vary the rate of fluid flow therethrough. The valve includes a second valve plate disposed within a cavity in the first valve plate, which is configured to rotate with the first valve plate.

In another aspect of the present application, various embodiments are provided in which the first valve plate in its closed position is configured to be moved away from the first valve port opening by a fluid pressure in the first valve port opening that is greater than fluid pressure in the second valve port opening, and the second valve plate in its closed position is configured to be moved against the second valve port opening by a fluid pressure in the first valve port opening that is greater than fluid pressure in the second valve port opening. Likewise, the second valve plate in its closed position is configured to be moved away from the second valve port opening by a fluid pressure in the second valve port opening that is greater than fluid pressure in the first valve port opening, and the first valve plate in its closed position is configured to be moved against the first valve port opening by a fluid pressure in the second valve port opening that is greater than fluid pressure in the first valve port opening.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure in any way.

Figure 1:
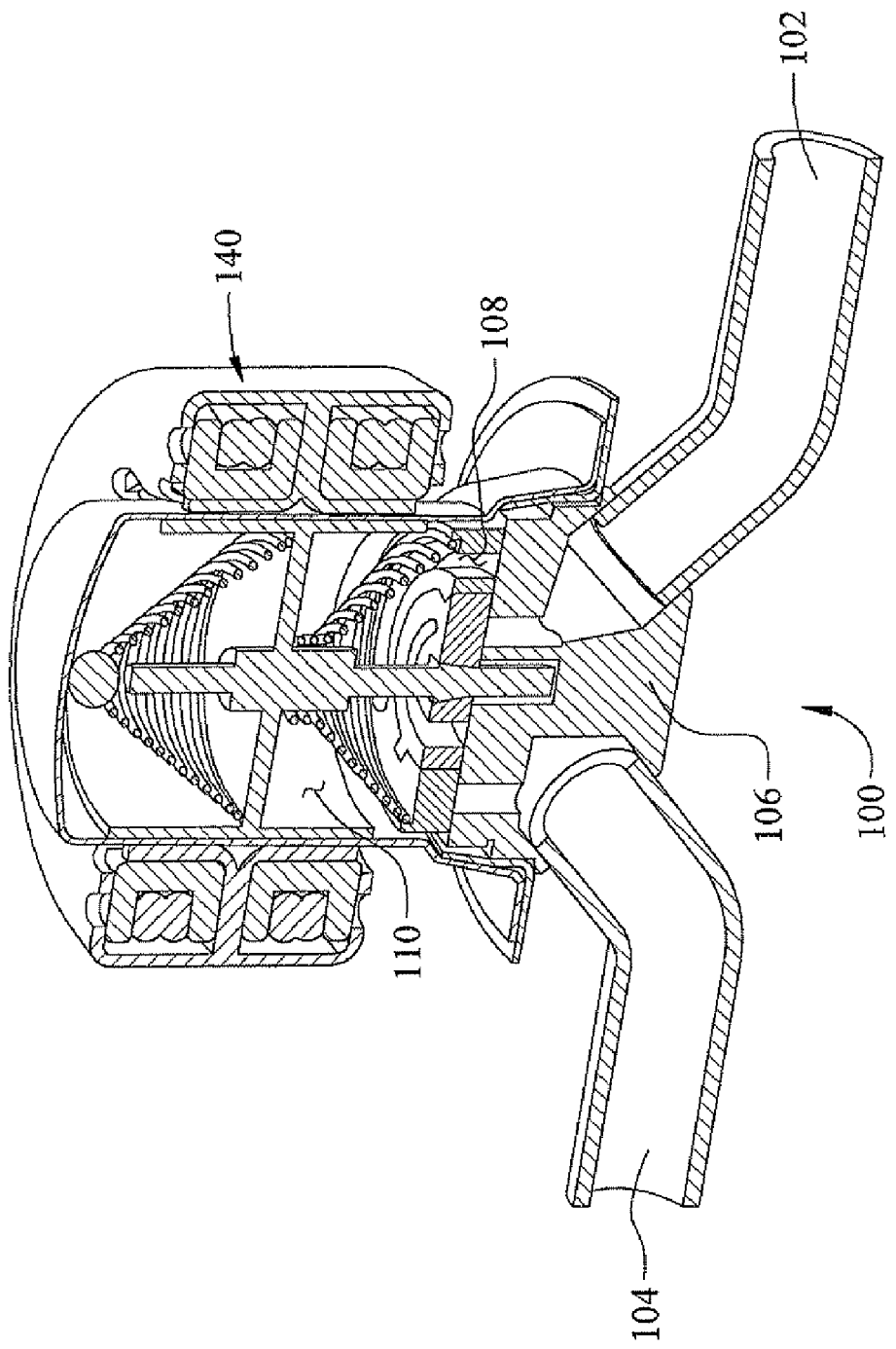
FIG. 1 is a cross-sectional perspective view of a first embodiment of a reversible flow expansion valve shown in a closed position, in accordance with the principles of the present disclosure.
Figure 5:
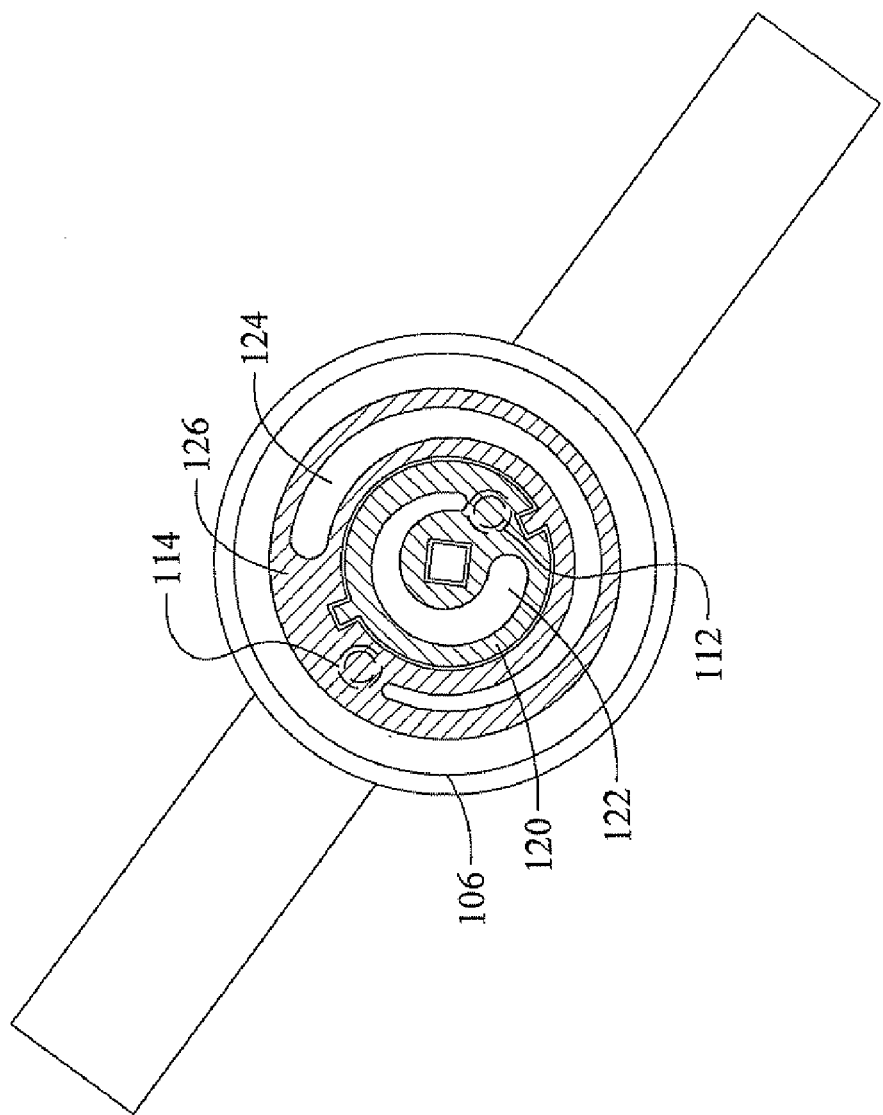
FIG. 5 is a top elevation view of the reversible flow expansion valve shown in FIG. 3, without the rotor of the stepper motor.
Figure 6B:
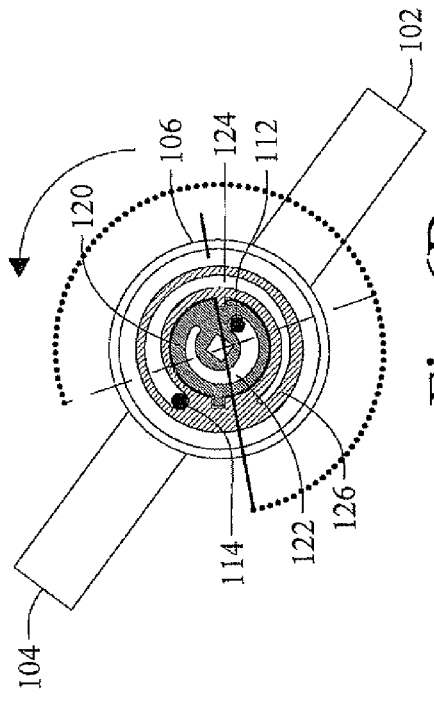
Figure 6D:
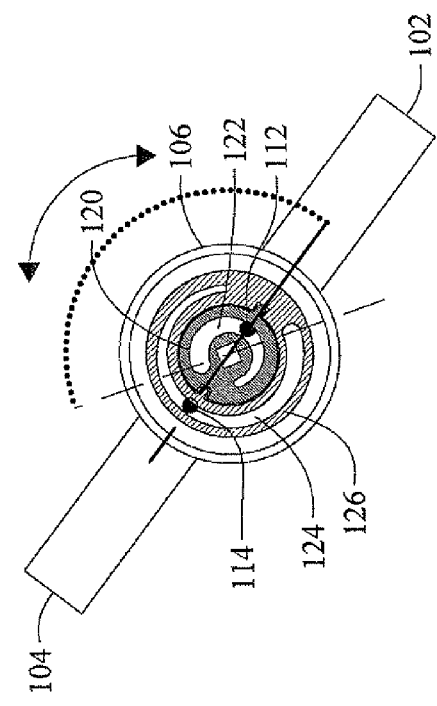
Figure 6A:
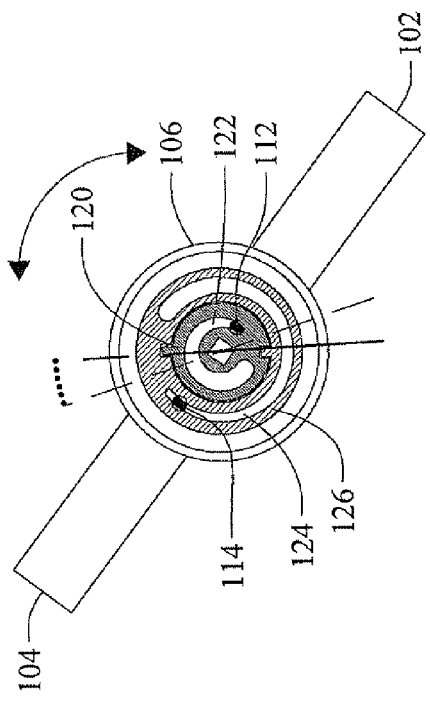
Figure 7:
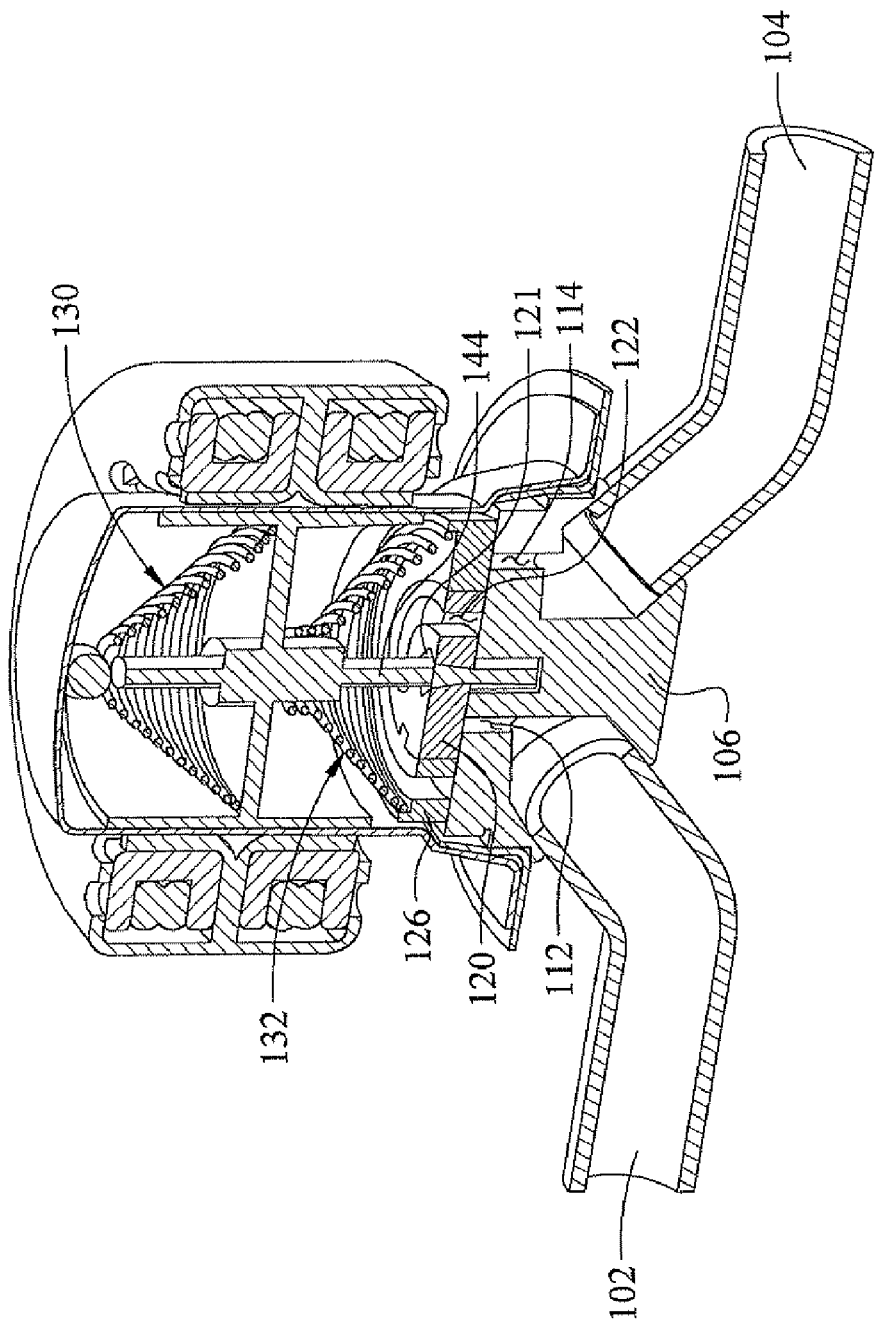
Figure 8:
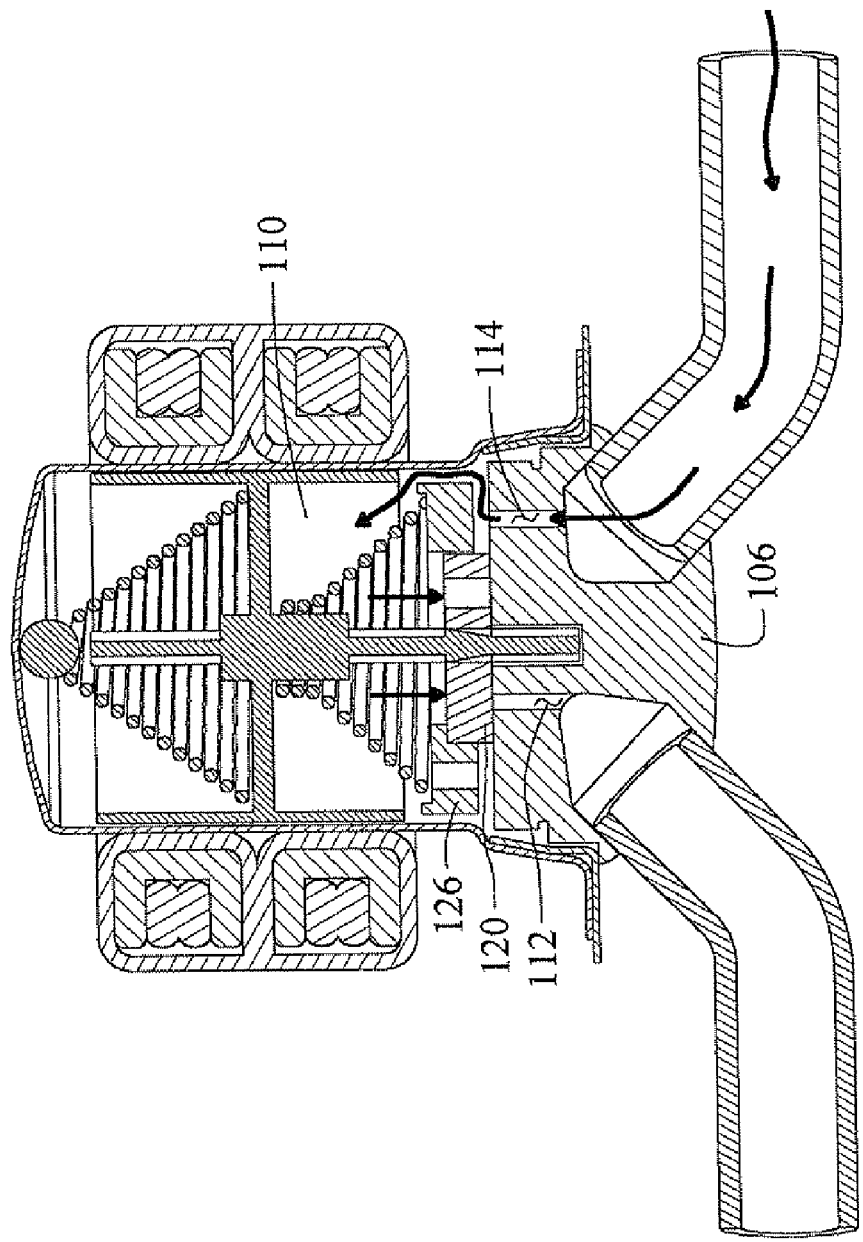
Figure 9:
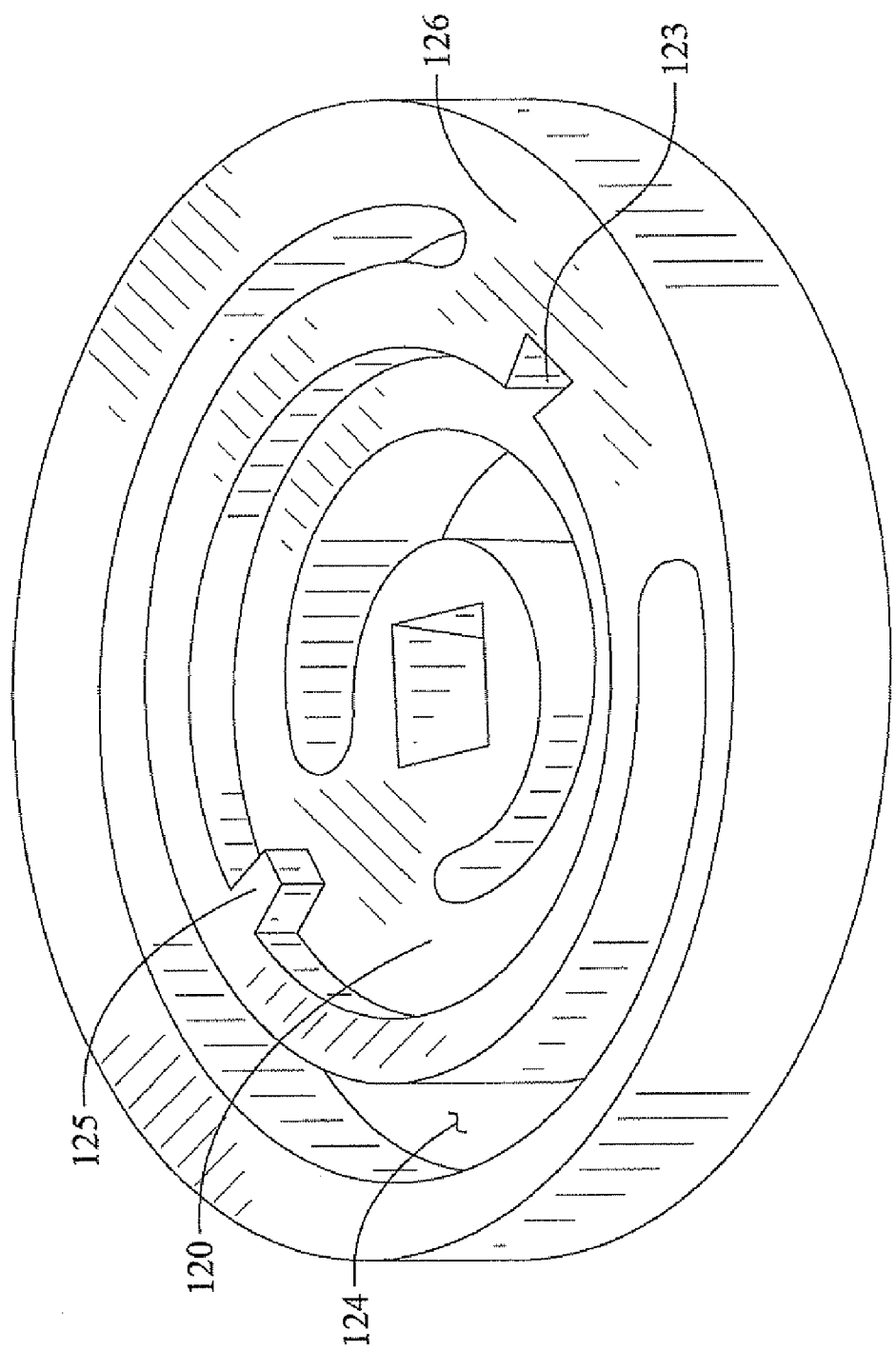
Figure 10:
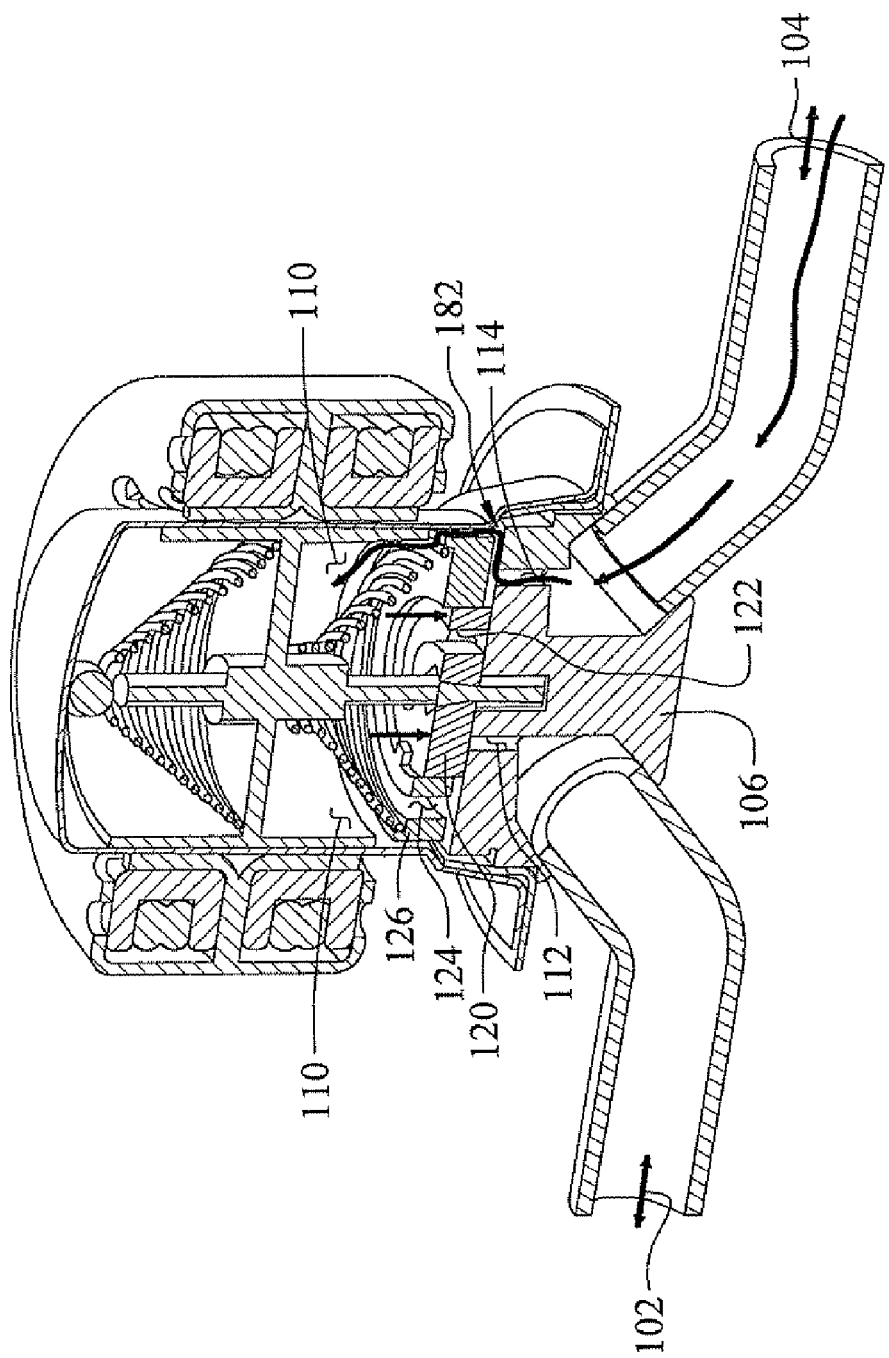
Figure 11:
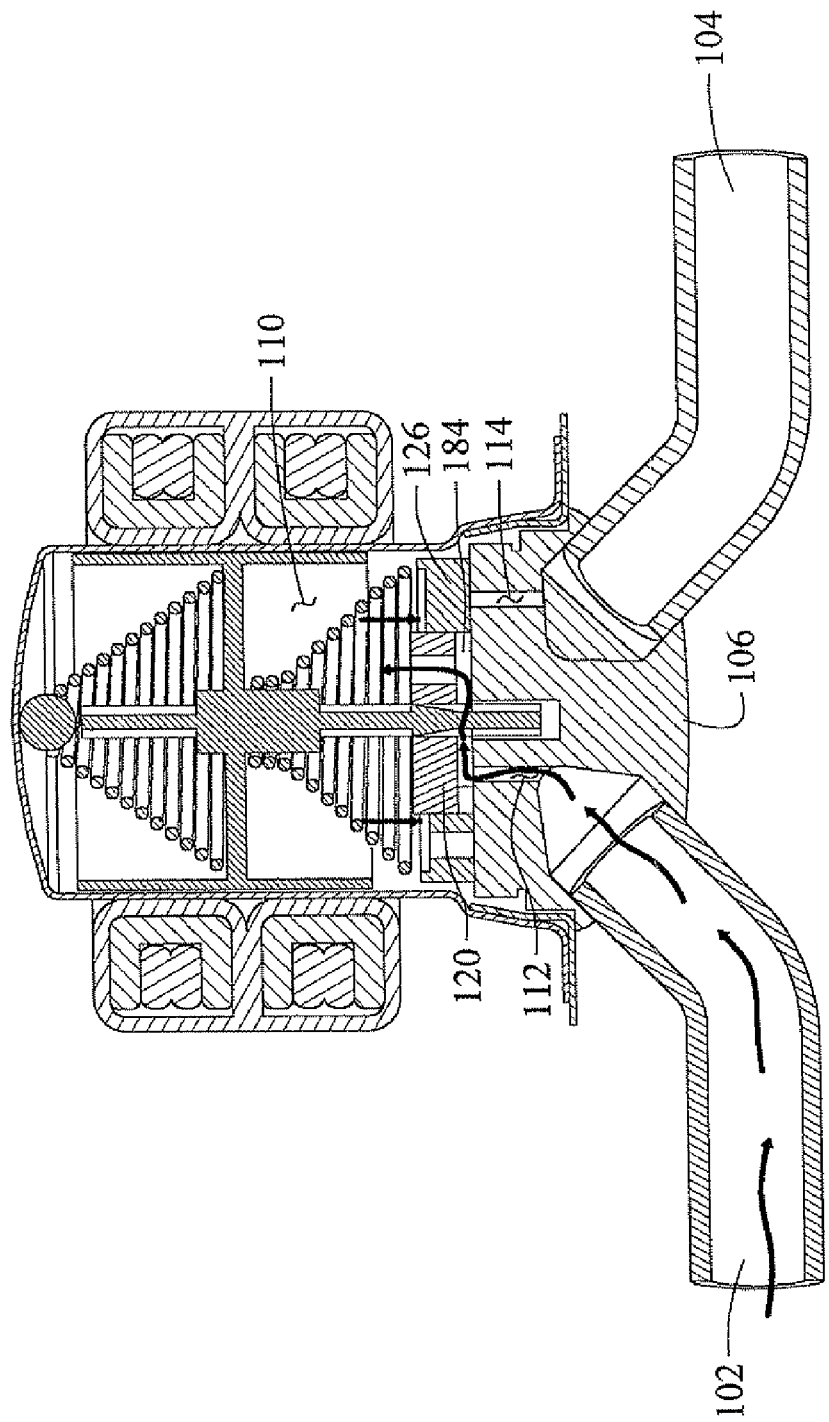
Figure 12:
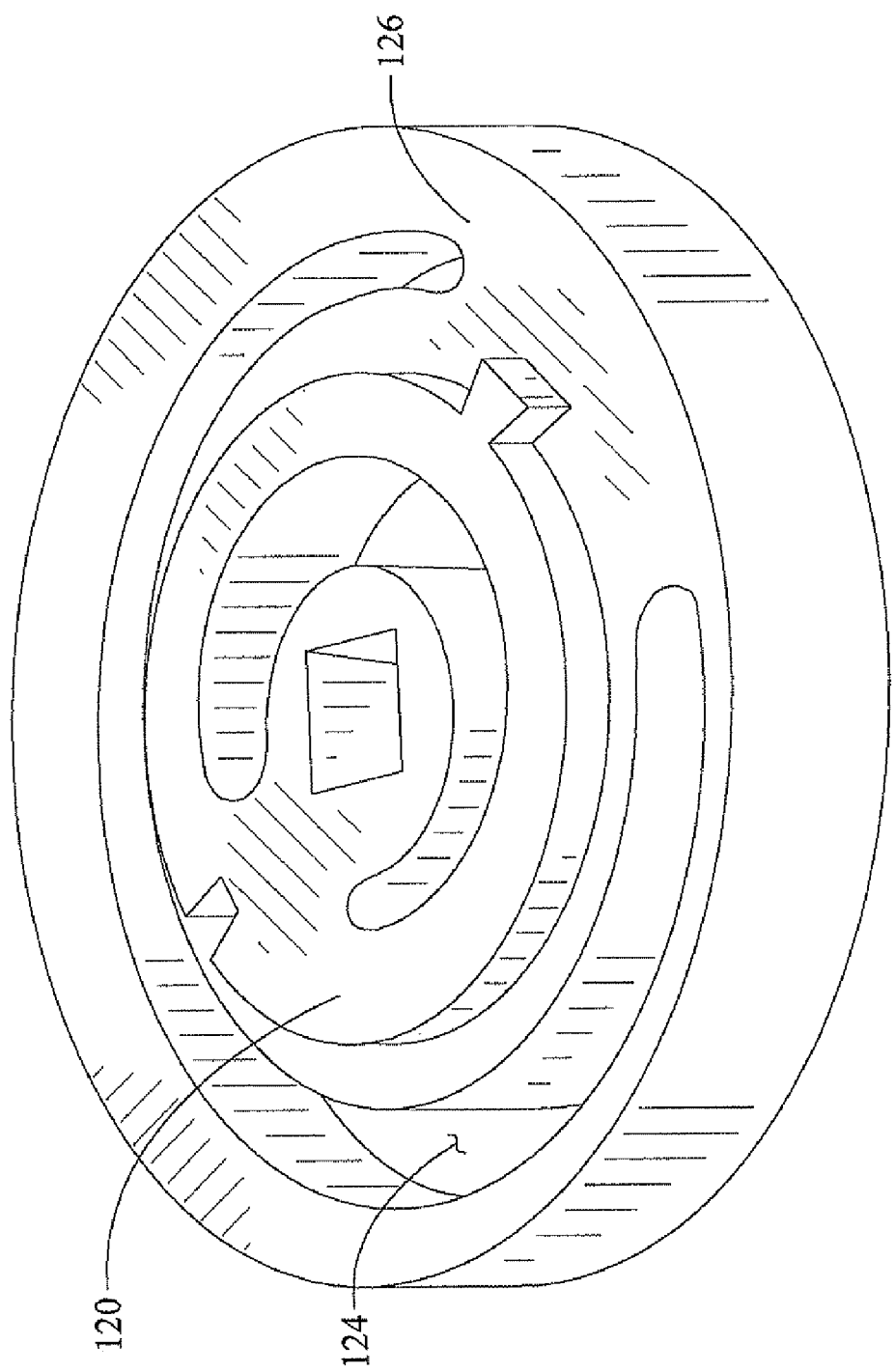
Figure 13:
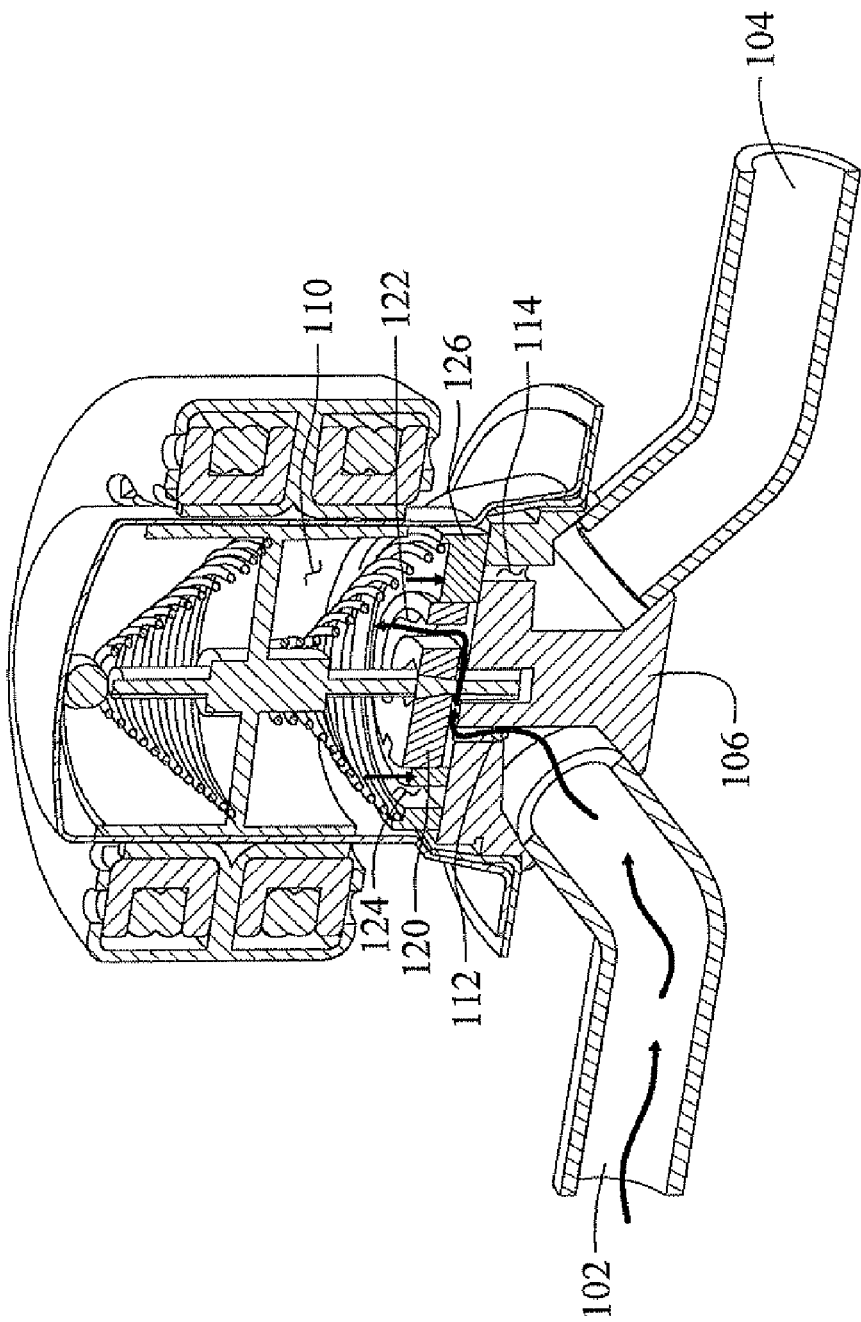
Figure 14:
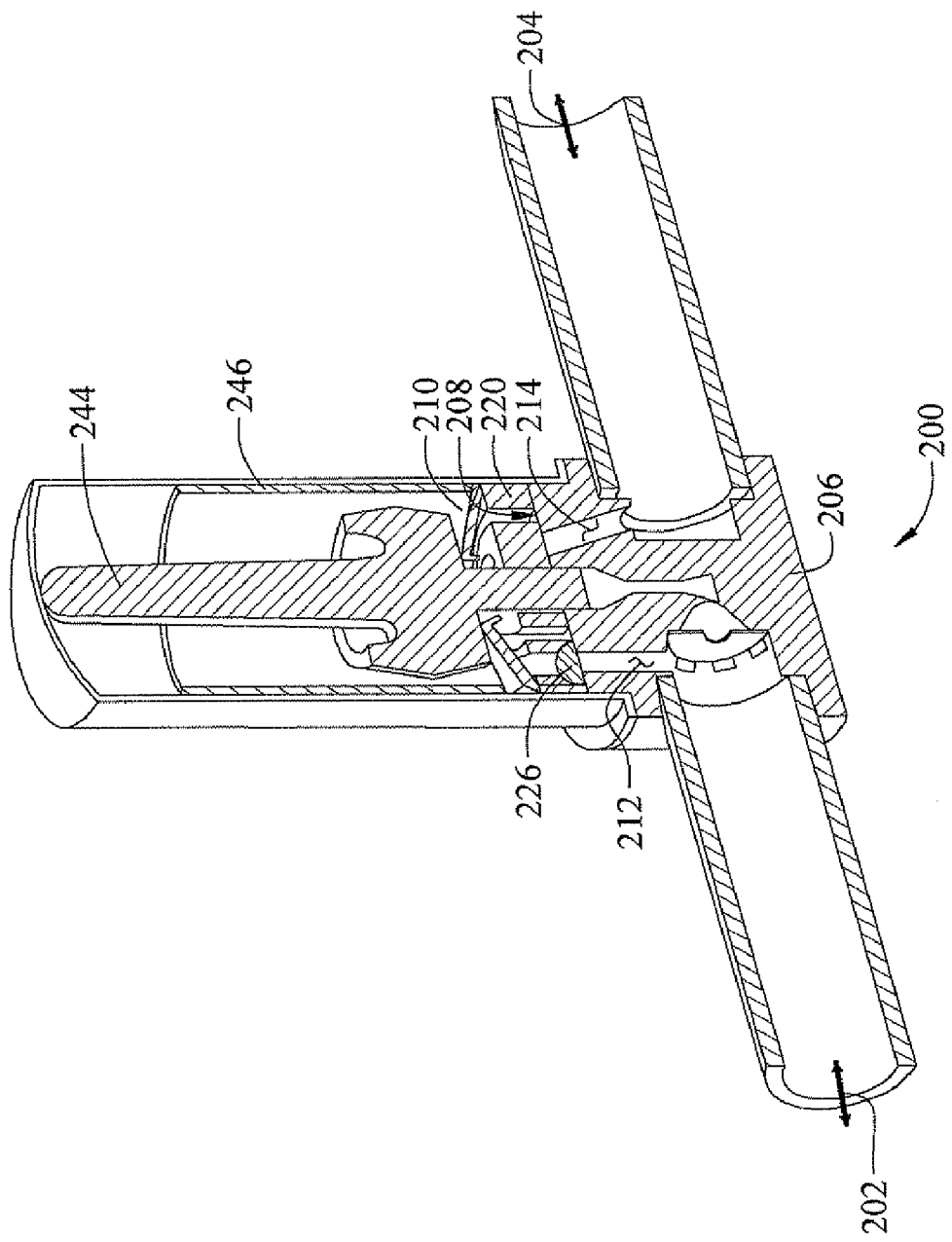
Figure 15:
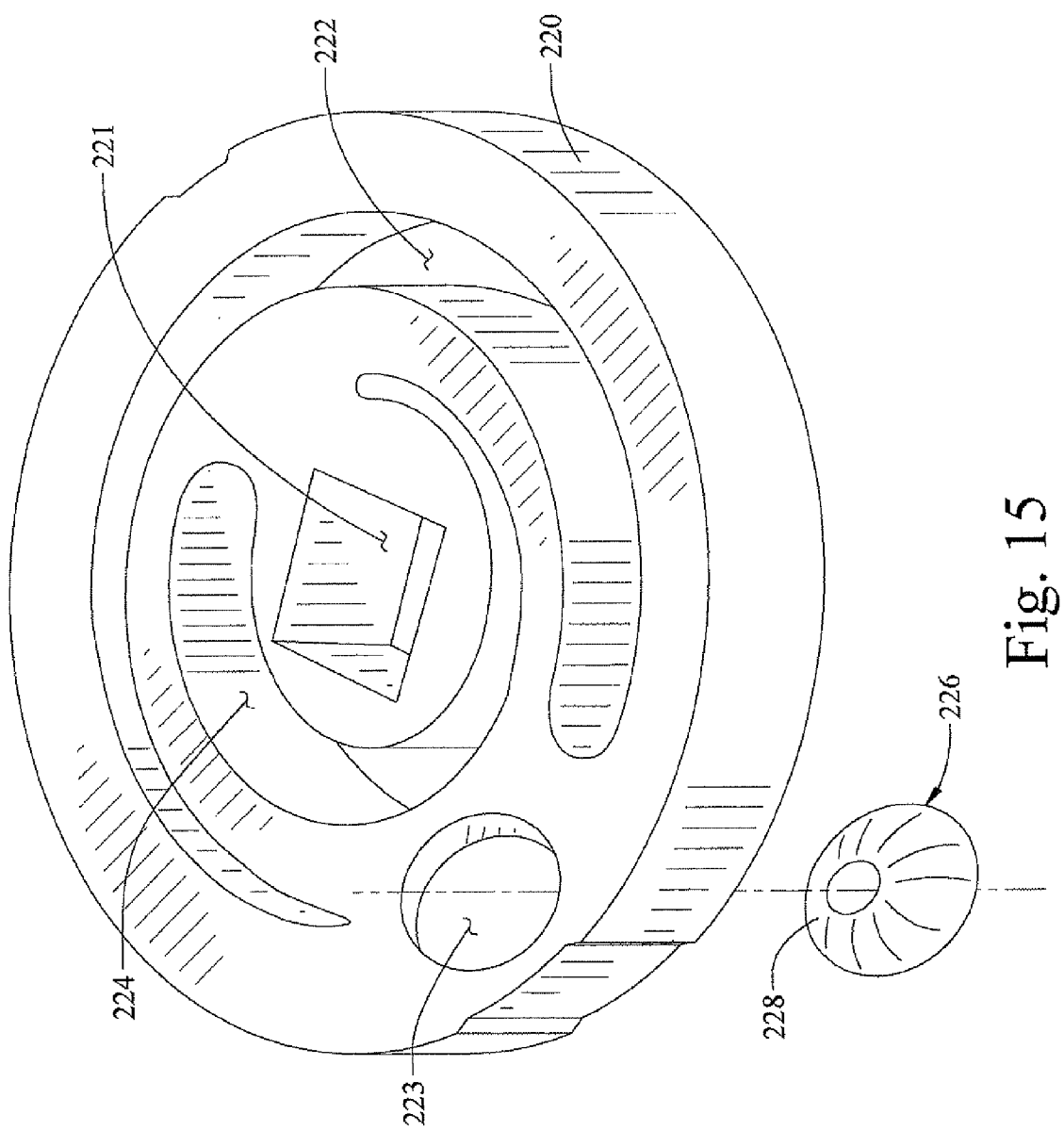
Figure 16:
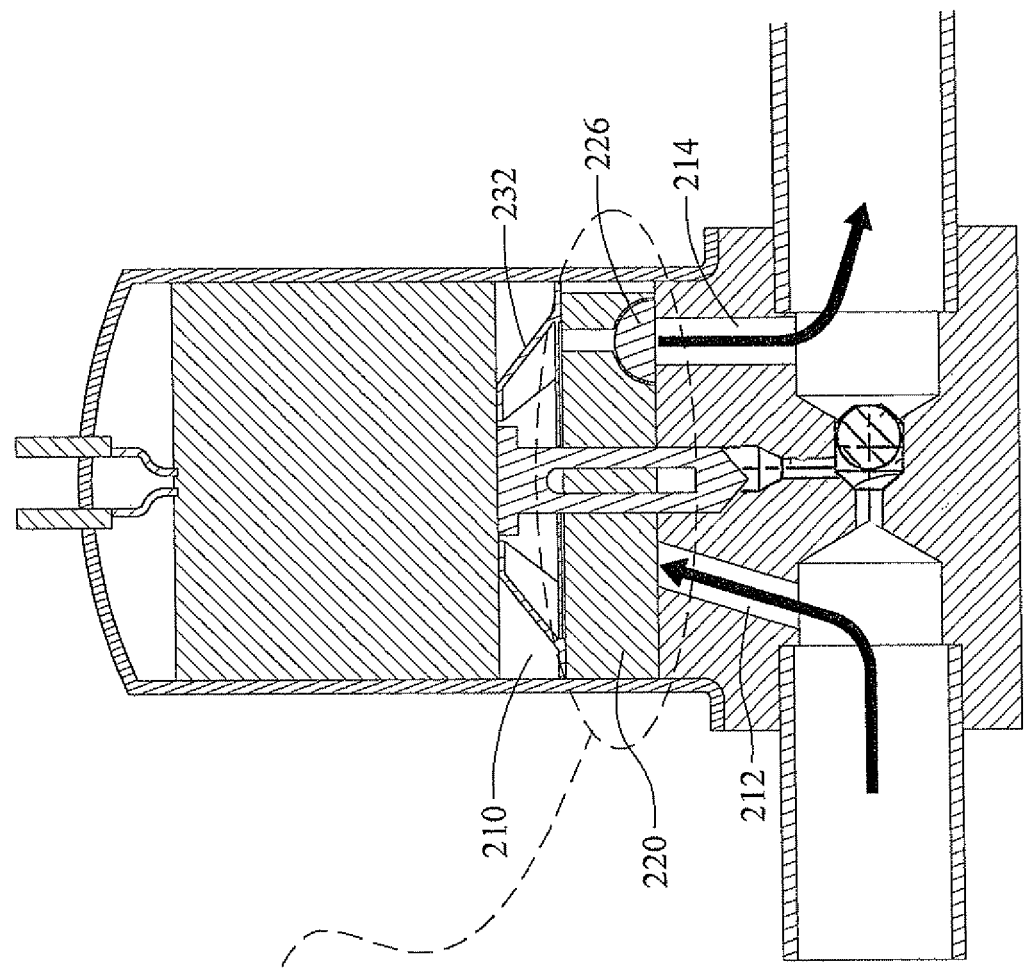
Figure 16:
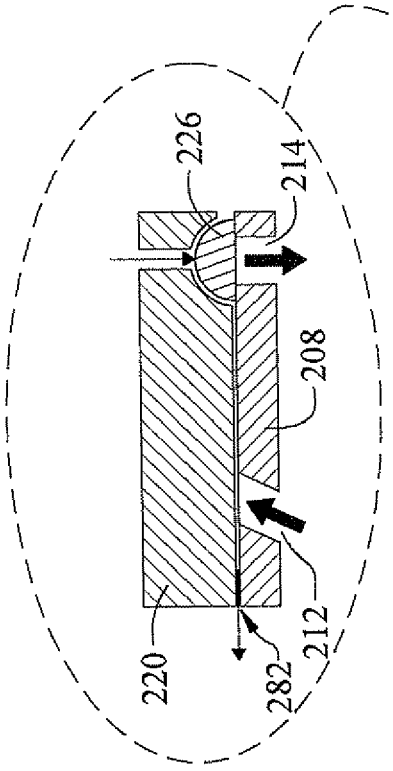
Figure 17:
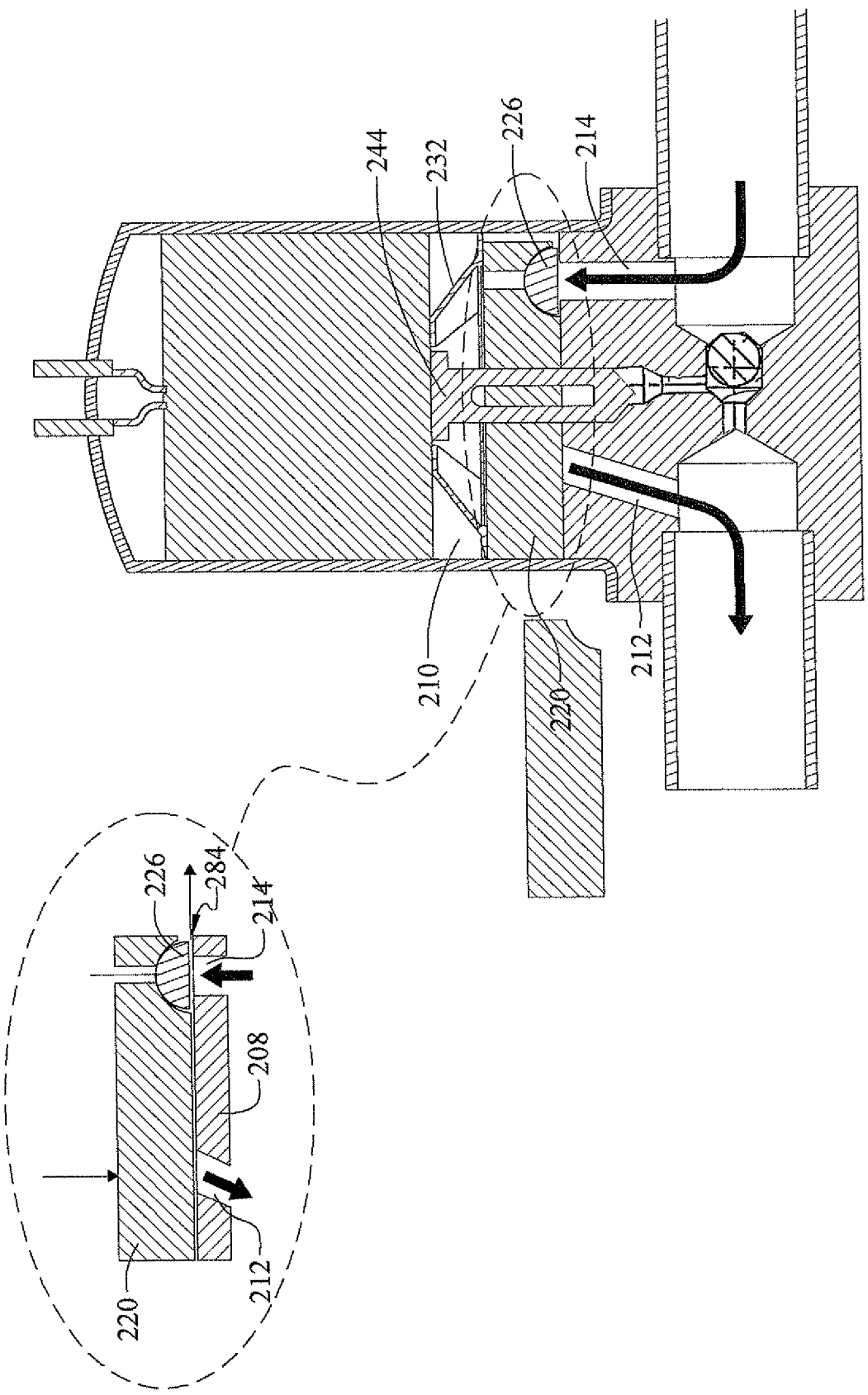

FIG. 6A-6B a top elevation view of the reversible flow expansion valve shown in FIG. 5, illustrating various rotational positions of the valve plates;

FIG. 7 is another cross-sectional perspective view of the reversible flow expansion valve shown in FIG. 1;

FIG. 8 is a cross-sectional side view of the reversible flow expansion valve shown in FIG. 1 with an outer valve plate elevated;

FIG. 9 is a perspective view of the inner and outer valve plates of the valve shown in FIG. 1, with an outer valve plate elevated;

FIG. 10 is a cross-sectional perspective view of the reversible flow expansion valve shown in FIG. 1 with an outer valve plate elevated;

FIG. 11 is a cross-sectional side view of the reversible flow expansion valve shown in FIG. 1 with an inner valve plate elevated;

FIG. 12 is a perspective view of the inner and outer valve plates of the valve shown in FIG. 1, with an inner valve plate elevated;

FIG. 13 is a cross-sectional perspective view of the reversible flow expansion valve shown in FIG. 1 with an inner valve plate elevated;

FIG. 14 is a cross-sectional perspective view of a second embodiment of a reversible flow expansion valve shown in a closed position, in accordance with the principles of the present disclosure;

FIG. 15 is a perspective view of the first and second valve disks of the reversible flow expansion valve shown in FIG. 14;

FIG. 16 is a cross-sectional side view of the reversible flow expansion valve shown in FIG. 14 with a first valve disk elevated; and FIG. 17 is a cross-sectional side view of the reversible flow expansion valve shown in FIG. 14 with a second valve disk elevated.

Corresponding reference numerals indicate corresponding parts throughout the several views of the drawings.

DETAILED DESCRIPTION

In the following description, numerous specific details are set forth such as examples of specific components, devices, methods, in order to provide a thorough understanding of embodiments of the present disclosure. It will be apparent to a person of ordinary skill in the art that these specific details need not be employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication and manufacture for those of ordinary skill.

According to various aspects of the present disclosure, there are provided various exemplary embodiments of a reversible flow expansion valve. In the various embodiments, a reversible flow expansion valve is provided that comprises a valve housing having a valve chamber including a first valve port opening and a second valve port opening in communication with a first inlet/outlet and a second inlet/outlet of the valve, respectively. The various embodiments further include a shaft rotatably disposed in the valve chamber. A first valve plate is disposed in the valve chamber over the first valve port opening, and is rotatably coupled to the shaft. The first valve plate has a first tapered semi-circular slot positioned in the first valve plate so as to align with the first valve port opening. The first valve plate is configured to rotate from a closed position, in which first valve plate is positioned over the first valve port opening, to an open position in which rotation of the first valve plate adjustably positions a wider or narrower portion of the first tapered semi-circular slot over the first valve port opening. This adjustably varies the rate of fluid flow through the first valve port opening. The first valve plate in its closed position is also configured to be movable in an axial direction towards and away from the first valve port opening. The various embodiments further include a second valve plate that is configured to rotate with the first valve plate, and is positioned over the second valve port opening when the first valve plate is rotated to the closed position. The second valve plate is also configured to be movable relative to the first valve plate, in an axial direction towards and away from the second valve port opening.

In another aspect of the various embodiments, the first valve plate in its closed position is configured to move away from the first valve port opening, and the second valve plate in the closed position is configured to move against the second valve port opening, to thereby resist fluid flow through the second valve port opening. Likewise, the second valve plate in its closed position is configured to move away from the second valve port opening, and the first valve plate in the closed position is configured to move against the first valve port opening, to thereby resist fluid flow through the first valve port opening.

Figure 2:
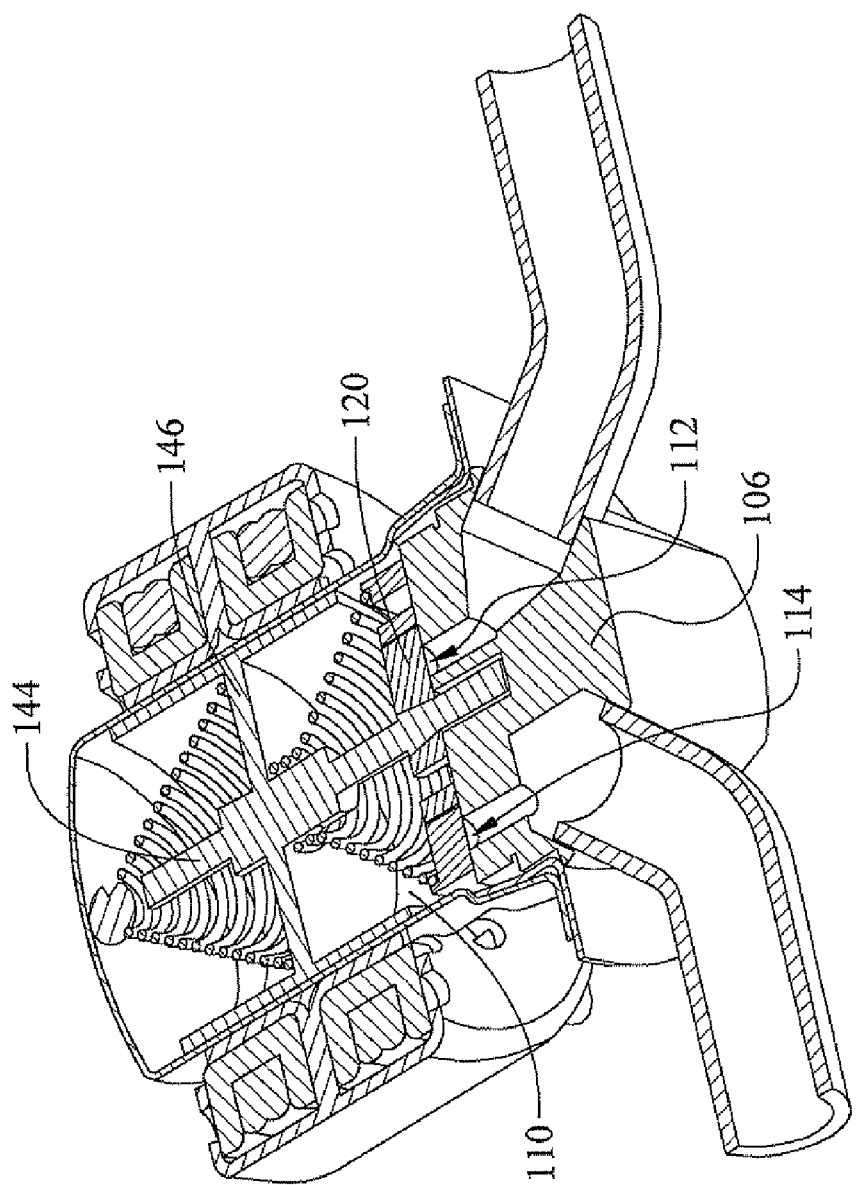
FIG. 2 is a cross-sectional lower perspective view of a second embodiment of a solenoid valve shown in a closed position.

Referring to FIG. 1, a first embodiment of a reversible flow expansion valve is shown generally at 100. The reversible flow expansion valve 100 comprises a valve housing 106 having a first inlet/outlet 102 and a second inlet/outlet 104 that are configured for fluid flow in either direction. The reversible flow expansion valve 100 further includes a valve chamber 110 having a lower wall 108 therein. As shown in FIG. 2, the lower wall 108 of the valve chamber 110 has a first valve port opening 112 in communication with the first inlet/outlet 102, and a second valve port opening 114 in communication with the second inlet/outlet 104. A shaft 144 is rotatably disposed in the valve chamber in a generally vertical or perpendicular orientation relative to the lower wall 108. The shaft 144 may further include a rotor 146, which may be coupled to the shaft 144, or alternatively, integrally formed with the shaft 144.

Figure 3:
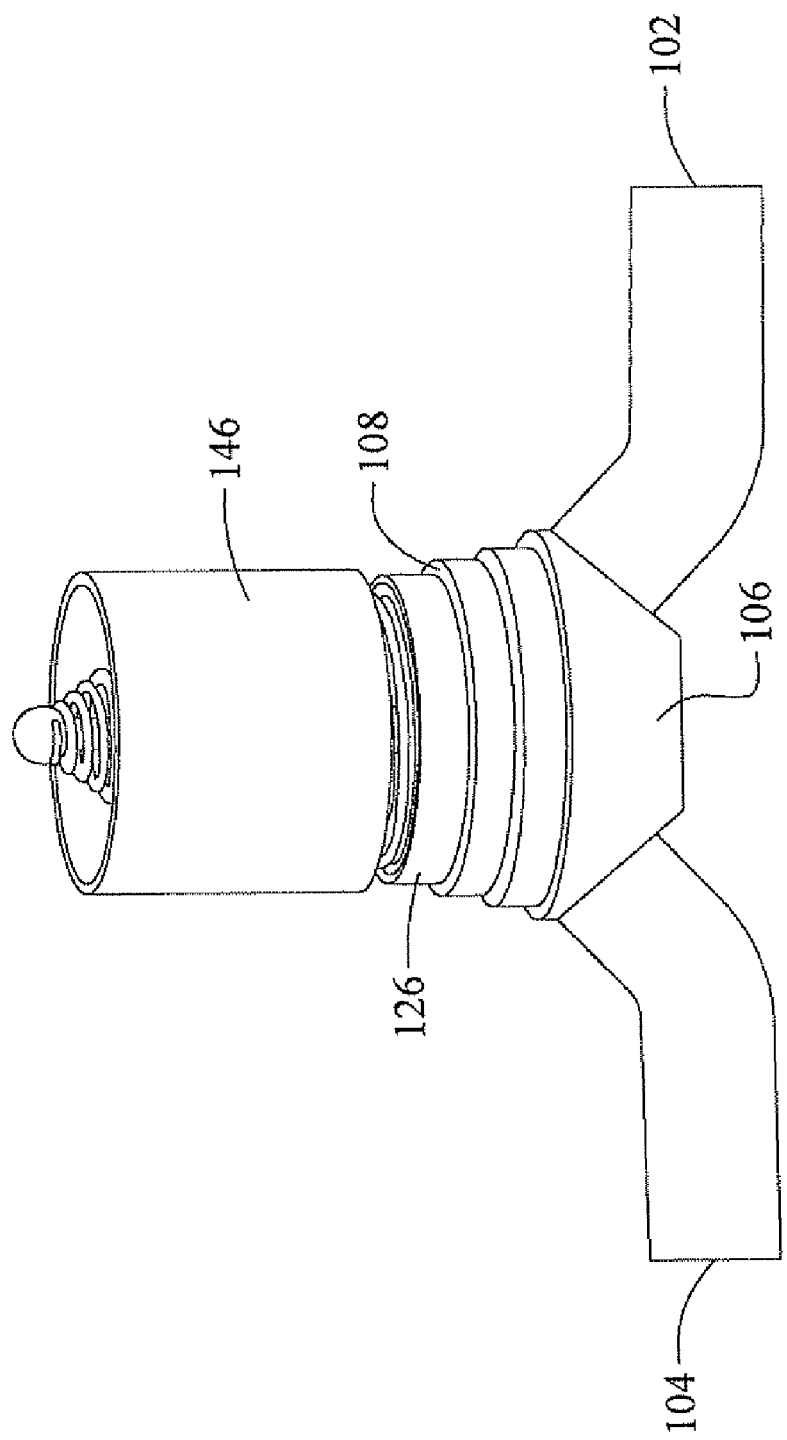
FIG. 3 is a front perspective view of the reversible flow expansion valve shown in FIG. 1, without the valve chamber housing and stepper motor.

An inner modulating disk 120 (or plate) is rotatably coupled to the shaft 144. Although the inner modulating plate shown in the various Figures has a generally round disk-shape, it should be noted that the various plates disclosed herein may alternatively comprise a shape other than that of a disk. As shown in FIG. 3, the inner modulating disk 120 is disposed in the valve chamber 110 over the first valve port opening 112, and is generally positioned against the lower wall 108 of the valve chamber 110.

Figure 4:
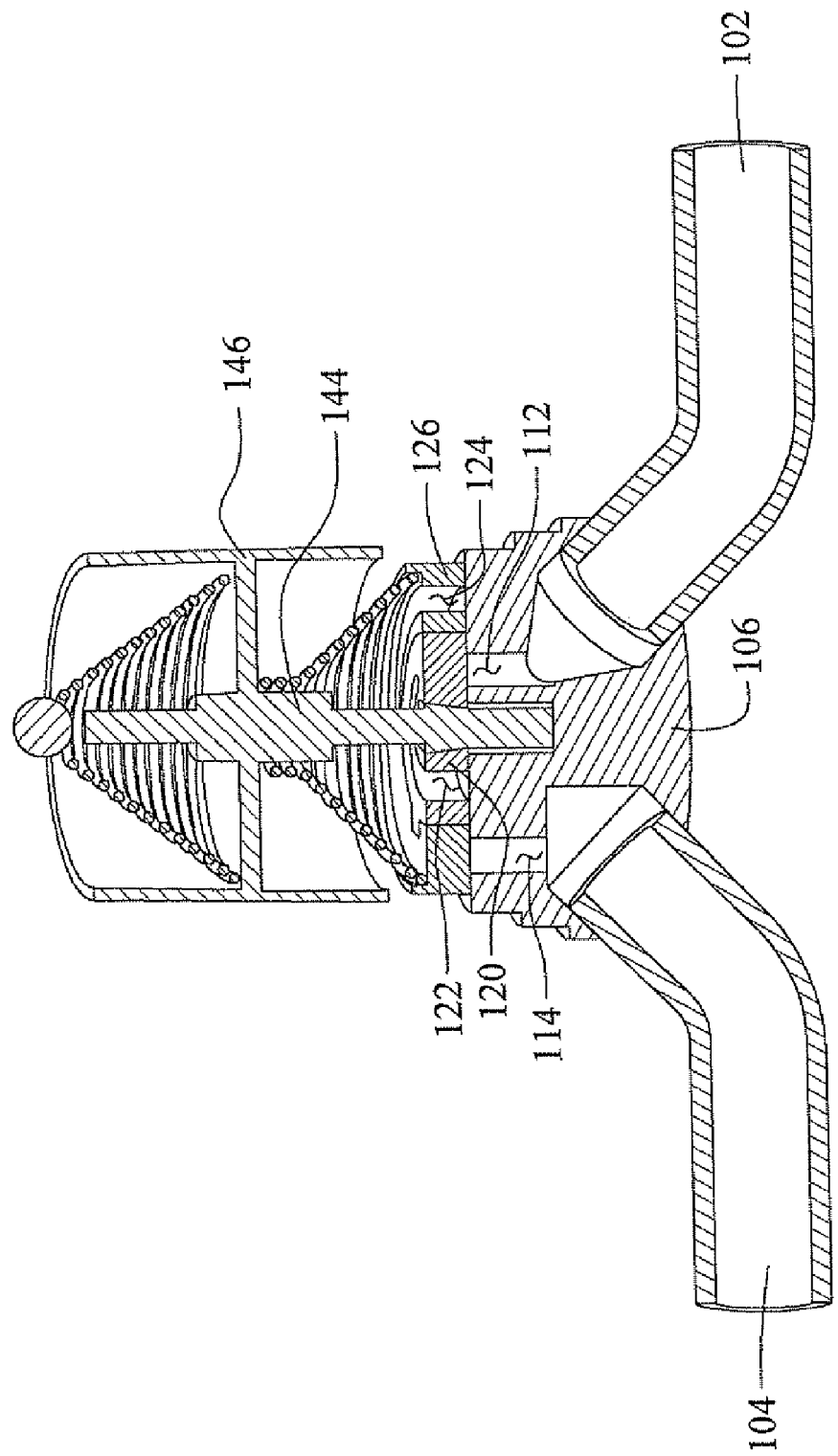
FIG. 4 is a cross-sectional side view of the reversible flow expansion valve shown in FIG. 3.

Referring to FIGS. 4-6, the inner modulating disk 120 has a first tapered semi-circular slot 122 that is aligned with the first valve port opening 112 (see FIG. 5). The inner modulating disk 120 is configured to rotate from a closed position, in which the inner modulating disk 120 is positioned over the first valve port opening 112 (shown in FIGS. 4 and 6A), to an open position in which rotation of the inner modulating disk 120 adjustably positions a wider or narrower portion of the first tapered semi-circular slot 122 over the first valve port opening 112 (shown in FIG. 6B-6D). The positioning of a wider or narrower portion of the first tapered semi-circular slot 122 over the first valve port opening 112 provides for adjustably varying the rate of fluid flow through the first valve port opening 112. As shown in FIG. 7, the inner modulating disk 120 is configured to rotate about its center, by virtue of a central aperture 121 having a keyed configuration, where rotation of the inner modulating disk 120 positions a portion of the first tapered semi-circular slot 122 over the first valve port opening 112.

Referring to FIG. 8, the inner modulating disk 120 in its closed position is further configured to be pushed against the first valve port opening 112 by a fluid pressure in the valve chamber 110 that is greater than the fluid pressure in the first valve port opening 112. This differential pressure above and below the inner modulating disk results in a downward force being applied, such that the inner modulating disk 120 sealingly engages the first valve port opening 112 and thereby resists fluid flow through the first valve port opening 112. The inner modulating disk 120 also includes a slot 123 that is configured to be coupled with a mating keyed-portion 125 of an outer modulating disk as shown in FIG. 9, which will be described below.

Figure 6C:
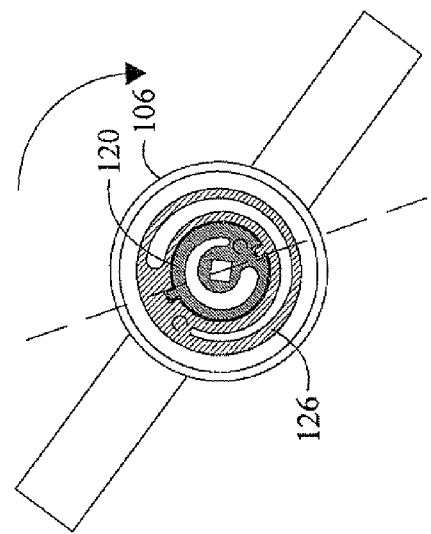

The reversible flow expansion valve 100 shown in FIG. 7 further comprises an outer modulating disk 126 encircling the inner modulating disk 120. The outer modulating disk 126 is disposed in the valve chamber 110 over the second valve port opening 114, and has a second tapered semi-circular slot 124 that is aligned with the second valve port opening 114 (see FIG. 5). The outer modulating disk 126 is coupled to and configured to rotate with the inner modulating disk 120. The outer modulating disk 126 rotates from a closed position, in which the outer modulating disk 126 is positioned over the second valve port opening 114 (as shown in FIGS. 4, 7 and 11), to an open position in which rotation of the outer modulating disk 126 adjustably positions a wider or narrower portion of the second tapered semi-circular slot 124 over the second valve port opening 114 (as shown in FIG. 6B-6D). The positioning of a wider or narrower portion of the second tapered semi-circular slot 124 over the second valve port opening 114 provides for adjustably varying the rate of fluid flow through the second valve port opening 114. Accordingly, rotation of the inner modulating disk 120 (and outer modulating disk encircling the inner modulating disk) adjustably positions a wider or narrower portion of both the first tapered semi-circular slot 122 and second tapered semi-circular slot 124 over the first valve port opening 112 and second valve port opening 114 respectively, to adjustably vary the rate of fluid flow through the valve 100.

The outer modulating disk 126 is further configured to be axially movable in a direction towards and away from the second valve port opening 114. Referring to FIG. 10, the outer modulating disk 126 in its closed position is also configured to be pushed against the second valve port opening 114 by a fluid pressure in the valve chamber 110 that is greater than the fluid pressure in the second valve port opening 114, such that the outer modulating disk 126 sealingly engages the second valve port opening 114 to thereby resist fluid flow through the second valve port opening 114.

Referring to FIG. 11, the inner modulating disk 120 in the first embodiment preferably comprises a plate having a generally round contour or periphery, a central aperture 121 having a keyed configuration or surface with which the inner modulating disk 120 may be rotated, and a first tapered semi-circular slot 122 that is concentric with the central aperture 121. The first tapered semi-circular slot 122 may be comet-shaped or semi-circular in contour, and generally partially encircles or surrounds the central aperture 121 in a concentric manner (as shown in FIG. 5, for example). The outer modulating disk 126 comprises a plate having a generally ring-shaped contour and a second tapered semi-circular slot 124 that is concentric with the first tapered semi-circular slot 122. The second tapered semi-circular slot 124 may also be comet-shaped or semi-circular in contour, and generally partially encircles or surrounds the central aperture 121 in a concentric manner (as shown in FIG. 5, for example). The inner and outer modulating disks 120, 126 are coupled to each other such that the first and second tapered semi-circular slots 122, 124 are disposed on generally opposing sides of the central aperture 121. The first and second tapered semi-circular slots 122, 124 are generally disposed on generally opposing sides of the central aperture 121 of the inner modulating disk 120, to correspondingly align with the first and second valve port openings 112 and 114 that are also on generally opposed sides of the valve chamber 110.

It should be noted that the valve may comprise an alternative construction in which the first tapered semi-circular slot 122 and second tapered semi-circular slot 124 are positioned on the same side of the central aperture 121 (as opposed to opposite sides), and the first and second valve port openings 112, 114 are likewise positioned on the same side of the valve chamber 110. Accordingly, the first and second inner and outer modulating disks 120, 126 may have a first tapered semi-circular slot 122 and second tapered semi-circular slot 124 in any arrangement that corresponds to the orientation of the first and second valve port openings 112, 114 within the valve chamber 110.

As shown in FIG. 7, the inner modulating disk 120 and outer modulating disk 126 are configured to be rotated to a substantially closed position, in which the inner modulating disk 120 is positioned over the first valve port opening 112, and the outer modulating disk 126 is positioned over the second valve port opening 114. In yet another aspect of the present disclosure, the inner modulating disk 120 and outer modulating disk 126 are further configured to be movable towards and away from their respective valve port openings. Specifically, the shaft 144 is configured to be movable in an axial direction such that the inner modulating disk 120 coupled to the shaft 144 is movable in a direction towards and away from the first valve port opening 112. The shaft 144 may further be biased by a first spring 130. As previously stated, the inner modulating disk 120 is coupled to the outer modulating disk 126 by a key 125 and slot 123 arrangement that permits the outer modulating disk 126 to move axially (relative to the inner modulating disk 120) toward and away from the second valve port opening 114, as explained below.

The inner modulating disk 120 in its closed position is positioned over the first valve port opening 112, and is configured to be moved against the first valve port opening 112 by a fluid pressure in the valve chamber 110 above the inner modulating disk 120 that is greater than the fluid pressure in the first valve port opening 112 below the inner modulating disk 120. This higher pressure above the inner modulating disk 120 results in a downward force being applied, such that the inner modulating disk 120 sealingly engages the first valve port opening 112 and thereby resists fluid flow through the first valve port opening 112. The outer modulating disk 126 in its closed position is positioned over the second valve port opening 114, and is configured to be moved against the second valve port opening 114 by a fluid pressure in the valve chamber 110 above the outer modulating disk 126 that is greater than the fluid pressure in the second valve port opening 114 below the outer modulating disk 126. This higher pressure above the outer modulating disk 126 results in a downward force being applied, such that the outer modulating disk 126 sealingly engages the second valve port opening 114, to thereby resist fluid flow through the second valve port opening 114. Accordingly, the inner and outer modulating disks 120, 126 are configured to move axially towards their respective valve port openings, such that a pressure in the valve chamber 110 that is higher than the pressure below a given modulating disk will provide for effectively sealing the disk against its respective valve port opening.

Referring to FIGS. 8-10, the inner modulating disk 120 and outer modulating disk 126 (in the closed position) are each configured to move axially away from their respective valve port openings 112, 114 when fluid pressure below the first or second inner or outer modulating disks 120, 126 is higher that the pressure in the valve chamber 110. A fluid pressure in the second valve port opening 114 that is higher than fluid pressure in the valve chamber 110 causes the outer modulating disk 126 in its closed position to move relative to the inner modulating disk 120 (see FIG. 9) in an axial direction away from the second valve port opening 114 (see FIG. 8). This permits communication of fluid pressure to the valve chamber 110 (see FIG. 10), which establishes a higher pressure in the valve chamber 110 than in the first valve port opening 112. A fluid pressure in the first valve port opening 112 that is lower than fluid pressure in the valve chamber 110 causes the inner modulating disk 120 (which is axially movable with the shaft 144) to move against the first valve port opening 112, and thereby establish a seal against the first valve port opening 112.

Referring to FIGS. 11-13, the inner modulating disk 120 (in the closed position) is also configured to move axially away from the first valve port opening 112 when fluid pressure below the inner modulating disk 120 is higher that the pressure in the valve chamber 110. A fluid pressure in the first valve port opening 112 that is higher than fluid pressure in the valve chamber 110 causes the inner modulating disk 120 in its closed position to move relative to the outer modulating disk 126 (see FIG. 12) in an axial direction away from the first valve port opening 112. This permits fluid flow into the valve chamber 110 (see FIG. 13), which establishes a higher pressure in the valve chamber 110 than in the second valve port opening 114. A fluid pressure in the second valve port opening 114 that is lower than fluid pressure in the valve chamber 110 causes the outer modulating disk 126 (which is axially movable relative to the inner modulating disk 120) to move against the second valve port opening 114, and thereby establish a seal against the second valve port opening 114. Thus, the inner modulating disk 120 and outer modulating disk 126 are configured to move away from their respective valve port openings where there is an uneven pressure between the first inlet/outlet 102 and the second inlet/outlet 104 of the valve 100, as explained below.

In the first embodiment of a reversible flow expansion valve, uneven pressures at the first inlet/outlet 102 and the second inlet/outlet 104 can act against the first and second modulating disks 120, 126 in their closed positions. To counteract this, the reversible flow expansion valve 100 includes a second biasing spring 132 for biasing the inner modulating disk 120 towards the first valve port opening 112. The inner modulating disk 120 in its closed position is configured to be moved away from the first valve port opening 112 (against the force of the second biasing spring 132) by a fluid pressure in the first valve port opening 112 that is greater than fluid pressure in the valve chamber 110 (e.g., fluid pressure at the first inlet/outlet 102 and the valve chamber 110 is higher than the pressure at the second inlet/outlet 104). Thus, fluid pressure in the first valve port opening 114 that is higher than fluid pressure in the valve chamber 110 causes the inner modulating disk 120 in its closed position to move in an axial direction away from the first valve port opening 112. This permits communication of fluid pressure via bleed chamber 184 to the valve chamber, which in turn pushes the outer modulating disk 126 against the second valve port opening 114 (see FIG. 13). The outer modulating disk 126 in its closed position is also configured to be moved away from the second valve port opening 114 by a fluid pressure in the second valve port opening 114 that is greater than fluid pressure in the valve chamber 110 (e.g., fluid pressure at the second inlet/outlet 104 and the valve chamber 110 is higher than the pressure at the first inlet/outlet 102). Thus, fluid pressure in the second valve port opening 114 that is higher than fluid pressure in the valve chamber 110 causes the outer modulating disk 126 in its closed position to move in an axial direction away from the second valve port opening 114.

The movement of either the first or second inner or outer modulating disks 120, 126 away from its respective valve port opening establishes communication of fluid pressure to the valve chamber 110 via a bleed passage 182, 184 between the lower wall 108 and disk (see FIG. 10 and FIG. 13). The bleed passages 182, 184 allow for communication of higher fluid pressure to the valve chamber 110, which in turn applies a force against the disk covering a valve port opening that is at a lower pressure, to thereby provide an improved seal.

The reversible flow expansion valve 100 may further include a motor 140 (see FIG. 1) for rotating the shaft 144 that is coupled to the inner modulating disk 120 via the central aperture 121, for effecting rotation of the inner and outer modulating disks 120, 126. The motor 140 controllably rotates the inner and outer modulating disks 120, 126 to incrementally index the first and second tapered semi-circular slots 122, 124 to a plurality of angular positions (see FIG. 6B-6D) for incrementally adjusting the rate of fluid flow through the first and second valve port openings 112, 114 and the valve 100. It should be noted that in the first embodiment, the motor 140 is preferably configured to hold its angular orientation and the position of the inner and outer modulating disks 120, 126 in the closed position relative to the valve port openings in the valve housing 106, so that the inner and outer modulating disks 120, 126 are continuously covering the valve port openings 112 and 114.

It should be appreciated from the above that rotation of the inner and outer modulating disks 120, 126 adjustably positions a wider or narrower portion of both the first and second tapered semi-circular slots 122, 124 over the first and second valve port openings 112, 114, respectively, to adjustably vary the rate of fluid flow through the valve 100. Furthermore, the movement of inner and outer modulating disks 120, 126 relative to the first and second valve port openings 112, 114 allows for establishing an improved seal against the first and second valve port openings 112, 114, to provide a check valve feature for addressing differential or uneven pressures between the first inlet/outlet 102 and the second inlet/outlet 104 (such as a pressure differential of at least 5 psi). Thus, the inner and outer modulating disks 120, 126 of the first embodiment provide for varying the fluid flow rate through the valve, and also provide for improved closure in either flow direction against the valve port opening that is at a lower pressure.

Referring to FIG. 14, a second embodiment of a reversible flow expansion valve 200 is shown. The second embodiment 200 functions similarly to that of the first embodiment. However, unlike the tapered semi-circular slots in the first embodiment that are respectively disposed in separate inner and outer modulating disks (120, 126), the first and second tapered semi-circular slots in the second embodiment are both disposed in an integrally formed first modulating disk in which a smaller, separate axially movable disk is disposed, as will be explained below.

The second embodiment of a reversible flow expansion valve 200 comprises a valve housing 206 having a first inlet/outlet 202 and a second inlet/outlet 204 configured for fluid flow in either direction. The reversible flow expansion valve 200 further includes a valve chamber 210 having a lower wall 208 therein. As shown in FIG. 14, the lower wall of the valve chamber 210 has a first valve port opening 212 in communication with the first inlet/outlet 202, and a second valve port opening 214 in communication with the second inlet/outlet 204. A shaft 244 is rotatably disposed in the valve chamber 210 in a generally vertical or perpendicular orientation relative to the lower wall 208. The shaft 244 may further include a rotor 246, which may be either coupled to the shaft 244 or integrally formed with the shaft 244.

A first modulating disk 220 (or plate) is rotatably coupled to the shaft 244. Although the first modulating plate shown in FIGS. 14-17 has a generally round disk-shape, it should be noted that the modulating plate may alternatively comprise a shape other than that of a disk. As shown in FIG. 14, the first modulating disk 220 is disposed in the valve chamber 210 over the first valve port opening 212, and is generally positioned against the lower wall 208 of the valve chamber 210. The first modulating disk 220 has a first tapered semi-circular slot 222 that is aligned with the first valve port opening 212, and has a second tapered semi-circular slot 224 that is aligned with the second valve port opening 214 (see FIG. 15). The first modulating disk 220 is configured to rotate about its center, by virtue of a central aperture 221 having a keyed configuration. The first modulating disk 220 is configured to rotate from a closed position, in which the first modulating disk 220 is positioned over the first valve port opening 212, to an open position, in which the first and second tapered semi-circular slots 222, 224 are positioned over the first and second valve port openings 212, 214. Similar to the various positions shown in FIGS. 6B-6D, the first modulating disk 220 may be rotated to varying angles, to adjustably position a wider or narrower portion of the first tapered semi-circular slot 222 over the first valve port opening 212, and a wider or narrower portion of the second tapered semi-circular slot 224 over the second valve port opening 214. The positioning of a wider or narrower portion of the first and second tapered semi-circular slots 222, 224 over the first and second valve port openings 212, 214 provides for adjustably varying the rate of fluid flow through the first and second valve port openings 212, 214 (and thereby the valve).

Referring to FIG. 15, the first modulating disk 220 preferably comprises a plate having a generally round contour or periphery, a central aperture 221 having a keyed configuration or surface with which the first modulating disk 220 may be rotated The first modulating disk 220 has a first tapered semi-circular slot 222 that is concentric with the central aperture 221, and a second tapered semi-circular slot 224 that is concentric with the first tapered semi-circular slot 222. The first tapered semi-circular slot 222 may be comet-shaped or semi-circular in contour, and generally partially encircles or is concentric to the central aperture 221 (as shown in FIG. 15). The first modulating disk 220 further comprises a second tapered semi-circular slot 224 that is also comet-shaped or semi-circular in contour, and generally partially encircles or is concentric to the central aperture 221. The first and second tapered semi-circular slots 222, 224 are disposed on generally opposing sides of the central aperture 221 of the first modulating disk 220, to correspondingly align with the first and second valve port openings 212 and 214 that are also on generally opposed sides of the valve chamber 210. The first and second tapered semi-circular slots 222, 224 are aligned or positioned to correspond with the position of the first and second valve port openings 212 and 214, such that rotation of the first modulating disk 220 adjustably positions a wider or narrower portion of both the first tapered semi-circular slot 222 and second tapered semi-circular slot 224 over the first valve port opening 212 and second valve port opening 214 respectively.

It should be noted that the valve may comprise an alternative construction in which the first tapered semi-circular slot 222 and second tapered semi-circular slot 224 are positioned on the same side of the central aperture 221 (as opposed to opposite sides), and the first and second valve port openings 212, 214 are likewise positioned on the same side of the valve chamber 210. Accordingly, the first and second pressure-responsive disks 220, 226 may have a first tapered semi-circular slot 222 and second tapered semi-circular slot 224 in any arrangement that corresponds to the orientation of the first and second valve port openings 212, 214 within the valve chamber 210.

Referring to FIG. 16, the first modulating disk 220 is further configured to be rotated to a closed position, in which the first modulating disk 220 is positioned over the first valve port opening 212, and the valve port opening 214 is covered by a second pressure-responsive disk (which will be described below). The first modulating disk 220 in its closed position is further configured to be pushed against the first valve port opening 212 by a fluid pressure in the valve chamber 210 that is greater than the fluid pressure in the first valve port opening 212. This higher pressure above the first modulating disk results in a downward force being applied, such that the first modulating disk 220 sealingly engages the first valve port opening 212 and thereby resists fluid flow through the first valve port opening 212. The first modulating disk 220 also includes a cavity 223 therein that is configured to receive a second pressure responsive disk, which will be described below.

The reversible flow expansion valve 200 shown in FIG. 14-17 further comprises a second pressure-responsive disk 226 disposed within the cavity 223 in the first modulating disk 220. The second pressure-responsive disk 226 comprises a plate having a generally disk-shaped contour, and a generally convex top surface 228 that corresponds to the surface contour of the cavity 223 in the first modulating disk 220. The second pressure-responsive disk 226 is confined between the cavity 223 and lower wall 208, such that it is configured to rotate with the first modulating disk 220. The second pressure-responsive disk 226 is smaller that the cavity 223 of the first modulating disk 220, such that the second pressure-responsive disk 226 is disposed within the cavity 223 in a floating manner that permits the second pressure-responsive disk 226 to move axially relative to the first modulating disk 220. As shown in FIG. 16, when the first modulating disk 220 is rotated to the closed position, the second pressure-responsive disk 226 within the cavity 223 is aligned with or positioned over the second valve port opening 214. When positioned over the second valve port opening 214, the second pressure-responsive disk 226 is configured to be pushed against the second valve port opening 214 by a fluid pressure in the valve chamber 210 that is greater than the fluid pressure in the second valve port opening 214. This higher pressure above the second pressure-responsive disk 226 results in a downward force being applied, such that the second pressure-responsive disk 226 sealingly engages the second valve port opening 214, to thereby resist fluid flow through the second valve port opening 214. Accordingly, the first and second disks 220, 226 are configured to move axially towards their respective valve port openings, such that a pressure in the valve chamber 210 that is higher than the pressure below a given modulating disk will provide for an effective seal between the disk and valve port opening.

In yet another aspect of the present disclosure, the first modulating disk 220 or second pressure-responsive disk 226 (in the closed position) are further configured to move axially away from their respective valve port openings 212, 214 when fluid pressure below the first or second disk 220, 226 is higher that the pressure in the valve chamber 210. Specifically, the shaft 244 is configured to be movable in an axial direction such that the first modulating disk 220 coupled to the shaft 244 is movable in a direction towards and away from the first valve port opening 212. As shown in FIG. 16, a fluid pressure in the first valve port opening 212 that is higher than fluid pressure in the valve chamber 210 causes the first modulating disk 220 in its closed position to move in an axial direction away from the first valve port opening 212. This permits communication of fluid pressure to the valve chamber 210 via passage 282 (see FIG. 16), which establishes a higher pressure in the valve chamber 210 than in the second valve port opening 214. A fluid pressure in the second valve port opening 214 that is lower than fluid pressure in the valve chamber 210 causes the second pressure-responsive disk 226 (which is movable within the cavity 223 in the first modulating disk 220) to move against the second valve port opening 214, and thereby establish a seal against the second valve port opening 214.

Likewise, the second pressure-responsive disk 226 is configured to be movable within the cavity 223 in the first modulating disk 220 in an axial direction away from the second valve port opening, as shown in FIG. 17. A fluid pressure in the second valve port opening 214 that is higher than fluid pressure in the valve chamber 210 causes the second pressure-responsive disk 226 in its closed position to move in an axial direction away from the second valve port opening 214. This permits communication of fluid pressure to the valve chamber 210 via passage 284 (see FIG. 17), which establishes a higher pressure in the valve chamber 210 than in the first valve port opening 212. A fluid pressure in the first valve port opening 212 that is lower than fluid pressure in the valve chamber 210 causes the first modulating disk 220 in its closed position to move in an axial direction against the first valve port opening 212. Thus, the first modulating disk 220 and second pressure-responsive disk 226 are configured to move away from their respective valve port openings where there is an uneven pressure between the first inlet/outlet 202 and the second inlet/outlet 204 of the valve 100, as explained below.

In the second embodiment of a reversible flow expansion valve 200, uneven pressures at the first inlet/outlet 202 and the second inlet/outlet 204 can act against the first and second disks 220, 226 in their closed positions. To counteract this, the reversible flow expansion valve 200 includes a biasing spring 232 for biasing the first modulating disk 220 towards the first valve port opening 212. The first modulating disk 220 in its closed position is configured to be moved away from the first valve port opening 212 (against the force of the biasing spring 232) by a fluid pressure in the first valve port opening 212 that is greater than fluid pressure in the valve chamber 210 (e.g., fluid pressure at the first inlet/outlet 202 and the valve chamber 210 is higher than the pressure at the second inlet/outlet 204). Thus, fluid pressure in the first valve port opening 212 that is higher than fluid pressure in the valve chamber 210 causes the first modulating disk 220 in its closed position to move in an axial direction away from the first valve port opening 212. The second pressure-responsive disk 226 in its closed position is also configured to be moved away from the second valve port opening 214 by a fluid pressure in the second valve port opening 214 that is greater than fluid pressure in the valve chamber 210 (e.g., fluid pressure at the second inlet/outlet 204 and the valve chamber 210 is higher than the pressure at the first inlet/outlet 202). Thus, fluid pressure in the second valve port opening 214 that is higher than fluid pressure in the valve chamber 210 causes the second pressure-responsive disk 226 in its closed position to move in an axial direction away from the second valve port opening 214.

The movement of either the first or second disk 220, 226 away from its respective valve port opening establishes communication of fluid pressure to the valve chamber 210 via a bleed passage 282, 284 between the lower wall 208 and disk. The bleed passages 282, 284 allow for communication of higher fluid pressure to the valve chamber 210, which in turn applies a force against the disk covering a valve port opening that is at a lower pressure, to thereby provide an improved seal between the disk and valve port opening.

Accordingly, the movement of first and second disks relative to the first and second valve port openings allows for establishing an improved seal against the first and second valve port openings, to provide a check valve feature for addressing differential or uneven pressures between one inlet/outlet and the other inlet/outlet (such as a pressure differential across the inlet and outlet of at least 5 psi). A differential or uneven pressure between the valve inlet and outlet would tend to subject the valve chamber to a higher pressure than the outlet, which could result in fluid leakage when the valve is in a closed position. The present design counteracts any uneven pressure situation by utilizing the higher fluid pressure in the valve chamber to establish a tight seal between the first or second pressure-responsive disk and its associated valve port opening in which fluid pressure is lower than the pressure in the valve chamber.

The reversible flow expansion valve 200 may further include a stepper motor rotor 246 connected to the shaft 244 that is coupled to the first modulating disk 220 via the central aperture 221, for effecting rotation of the first modulating disk 220. The rotor 246 controllably rotates the first and second disks 220, 226 to incrementally index the first and second tapered semi-circular slots 222, 224 to a plurality of angular positions (similar to that shown in FIG. 6B-6D) for incrementally adjusting the rate of fluid flow through the first and second valve port openings 212, 214 and the valve 200. It should be noted that in the first embodiment, the rotor 246 is preferably configured to hold its angular orientation and the position of the first and second disks 220, 226 in the closed position relative to the valve port openings in the valve housing 206.

It should be appreciated from the above that rotation of the first modulating disk 220 (which rotates the second pressure-responsive disk 226) adjustably positions a wider or narrower portion of both the first and second tapered semi-circular slots 222, 224 over the first and second valve port openings 212, 214, respectively, to adjustably vary the rate of fluid flow through the valve 200. When rotated to the closed position, the second pressure-responsive disk 226 is configured to sealingly move against the second valve port opening 214 when pressure in the second valve port opening is lower than that of the valve chamber 210 and first valve port opening 212, and is further configured to move away from the second valve port opening 214 and cause the first modulating disk 220 to sealingly move against the first valve port opening 212 when pressure in the first valve port opening 212 is lower than that of the valve chamber 210 and second valve port opening 214, so as to provide an improved seal against the valve port opening having the lower pressure. Thus, the first and second disks 220, 226 of the second embodiment provide for varying the fluid flow rate through the valve, and also provide for improved closure in either flow direction against the valve port opening having the lower pressure therein.

It should be noted that any of the preceding exemplary embodiments, various features may be combined, substituted or omitted. Alternative constructions of one or more of the above exemplary embodiments may include various combinations of the above disclosed features. For example, various alternate embodiments may include or omit either of the disclosed check valve designs, and bleed valve passage, and may further include or omit the biasing spring. Additionally, the above exemplary embodiments may comprise various alternate constructions of the modulating member, in which various designs of a slot or groove having varying cross-sectional width may be employed to gradually change the effective opening area through which fluid may flow through the valve.

Accordingly, the description of the various embodiments above is merely exemplary in nature and, thus, variations that do not depart from the gist of the invention are intended to be within the scope of the invention. Additional design considerations, such as the control of the application of voltage to the stepper motor, may be incorporated without departing from the spirit and scope of the invention. Such variations are not to be regarded as a departure from the spirit and scope of the invention. Accordingly, it is not intended that the invention be limited by the particular embodiment or form described above, but by the appended claims.

Terms such as "upper," "lower," "inner," "outer," "vertically," "horizontally," "inwardly," "outwardly," and the like when used herein refer to positions of the respective elements as they are shown in the accompanying drawings, and the disclosure is not necessarily limited to such positions.

The foregoing description of the embodiments of the present invention has been provided for purposes of illustration and description. It is not intended to be exhaustive or to limit the invention to the precise forms disclosed. Individual elements or features of a particular embodiment are generally not limited to that particular embodiment, but, where applicable, are interchangeable and can be used in a selected embodiment, even if not specifically shown or described.

What is claimed is:

1. A reversible flow valve with a first inlet/outlet and second inlet/outlet configured for fluid flow in either direction; the reversible flow valve comprising:
   a valve chamber having a lower wall with a first valve port opening and a second valve port opening in communication with a first inlet/outlet and a second inlet/outlet of the valve, respectively;
   a shaft rotatably disposed in the valve chamber in a generally vertical orientation;
   an inner modulating disk rotatably coupled to the shaft, the inner modulating disk disposed in the valve chamber over the first valve port opening, and having at least a first tapered semi-circular slot that is aligned with the first valve port opening, where the inner modulating disk is configured to rotate from a closed position, in which the inner modulating disk is positioned over the first valve port opening, to an open position in which rotation of the inner modulating disk adjustably positions a wider or narrower portion of the first tapered semi-circular slot over the first valve port opening, to adjustably vary the rate of fluid flow through the first valve port opening and the first tapered semi-circular slot, the inner modulating disk being configured to be movable in an axial direction towards and away from the first valve port opening;
   an outer modulating disk encircling the inner modulating disk, the outer modulating disk disposed in the valve chamber over the second valve port opening, and having a second tapered semi-circular slot that is aligned with the second valve port opening, the outer modulating disk being configured to rotate with the inner modulating disk from a closed position, in which the outer modulating disk is positioned over the second valve port opening, to an open position in which rotation of the outer modulating disk adjustably positions a wider or narrower portion of the second tapered semi-circular slot over the second valve port opening, to adjustably vary the rate of fluid flow through the second valve port opening and the second tapered semi-circular slot, the outer modulating disk being configured to be movable in an axial direction towards and away from the second valve port opening;
   wherein the inner modulating disk in the closed position is configured to move away from the first valve port opening, and the outer modulating disk in the closed position is configured to move against the second valve port opening, to thereby resist fluid flow through the second valve port opening; and wherein the outer modulating disk in the closed position is configured to move away from the second valve port opening, and the inner modulating disk in the closed position is configured to move against the first valve port opening, to thereby resist fluid flow through the first valve port opening.

2. The valve of claim 1, wherein the inner modulating disk in the closed position is configured to move away from the first valve port opening by a fluid pressure in the first inlet/outlet and first valve port opening that is higher than the fluid pressure in the second inlet/outlet, to communicate said higher fluid pressure to the valve chamber, and the outer modulating disk in the closed position is configured to be pushed against the second valve port opening by a fluid pressure in the valve chamber that is higher than the fluid pressure in the second valve port opening, to thereby resist fluid flow through the second valve port opening, and wherein the outer modulating disk in the closed position is configured to move away from the second valve port opening by a fluid pressure in the second inlet/outlet and second valve port opening that is higher than the fluid pressure in the first inlet/outlet, to communicate said higher fluid pressure to the valve chamber, and the inner modulating disk in the closed position is configured to be pushed against the first valve port opening by a fluid pressure in the valve chamber that is higher than the fluid pressure in the first valve port opening, to thereby resist fluid flow through the first valve port opening.

3. The valve of claim 1, further comprising a first biasing spring for biasing the inner modulating disk towards the first valve port opening.

4. The valve of claim 3, wherein the inner modulating disk in its closed position is configured to be moved away from the first valve port opening against the force of the first biasing spring by a fluid pressure in the first valve port opening that is greater than fluid pressure in the valve chamber.

5. The valve of claim 4, further comprising a second biasing spring for biasing the outer modulating disk towards the second valve port opening.

6. The valve of claim 5, wherein the outer modulating disk in its closed position is configured to be moved away from the second valve port opening against the force of the second biasing spring by a fluid pressure in the second valve port opening that is greater than fluid pressure in the valve chamber.

7. The valve of claim 1, wherein the shaft is configured to be movable in an axial direction such that the inner modulating disk coupled to the shaft is movable in a direction towards and away from the first valve port opening, wherein fluid pressure in the first valve port opening that is higher than fluid pressure in the valve chamber causes the inner modulating disk in its closed position to move in an axial direction away from the first valve port opening, and fluid pressure in the first valve port opening that is lower than fluid pressure in the valve chamber causes the inner modulating disk in its closed position to move in an axial direction against the first valve port opening.

8. A reversible flow valve configured for fluid flow in either direction; the valve comprising:
a valve housing having a valve chamber including a first valve port opening and a second valve port opening in communication with a first inlet/outlet and a second inlet/outlet of the valve, respectively;
a first valve plate disposed in the valve chamber over the first valve port opening and rotatably coupled to the shaft, the first valve plate having a first tapered semi-circular slot positioned in the first valve plate so as to align with the first valve port opening, where the first valve plate is configured to rotate from a closed position, in which the first valve plate is positioned over the first valve port opening, to an open position in which rotation of the first valve plate adjustably positions a wider or narrower portion of the first tapered semi-circular slot over the first valve port opening, to adjustably vary the rate of fluid flow through the first valve port opening, wherein the first valve plate in its closed position is configured to be movable in an axial direction towards and away from the first valve port opening; and
a second valve plate that is configured to rotate with the first valve plate, the second valve plate being configured to cover the second valve port opening when the first valve plate is rotated to the closed position, wherein the second valve plate in its closed position is configured to be movable relative to the first valve plate in an axial direction towards and away from the second valve port opening;
wherein the first valve plate in the closed position is configured to move away from the first valve port opening, and the second valve plate in the closed position is configured to move against the second valve port opening, to thereby resist fluid flow through the second valve port opening; and
wherein the second valve plate in the closed position is configured to move away from the second valve port opening, and the first valve plate in the closed position is configured to move against the first valve port opening, to thereby resist fluid flow through the first valve port opening.

9. The valve of claim 8, wherein the first valve plate comprises a plate having a generally round contour, a central aperture having a keyed configuration, a first tapered semi-circular slot concentric with the aperture, a second tapered semi-circular slot concentric with the first tapered semi-circular slot, and a cavity therein.

10. The valve of claim 9, wherein the second valve plate is disposed within the cavity in the first valve plate, and comprises a plate having a generally disk shaped contour and a generally convex-shaped upper surface, said second valve plate being smaller than the cavity of the first valve plate such that the second valve plate is configured to move within the cavity in an axial direction relative to the first valve plate.

11. The valve of claim 10, wherein the first valve plate includes a first tapered semi-circular slot positioned therein so as to align with the first valve port opening, and a second tapered semi-circular slot positioned therein so as to align with the second valve port opening, the first valve plate being configured to rotate from a closed position to an open position in which rotation of the first valve plate adjustably positions a wider or narrower portion of the first and second tapered semi-circular slots over the first and second valve port openings respectively, wherein fluid flow rate through the valve is controlled by the rotational positioning of a wider or narrower portion of the first and second tapered semi-circular slots over the first and second valve port openings respectively.

12. The valve of claim 10, wherein the first valve plate in the closed position is configured to move away from the first valve port opening by a fluid pressure in the first inlet/outlet and first valve port opening that is higher than the fluid pressure in the second inlet/outlet, to communicate said higher fluid pressure to the valve chamber, and the second valve plate in the closed position is configured to be pushed against the second valve port opening by a fluid pressure in the valve chamber that is higher than the fluid pressure in the second valve port opening, to thereby resist fluid flow through the second valve port opening, and wherein the second valve plate in the closed position is configured to move away from the second valve port opening by a fluid pressure in the second inlet/outlet and second valve port opening that is higher than the fluid pressure in the first inlet/outlet, to communicate said higher fluid pressure to the valve chamber, and the first valve plate in the closed position is configured to be pushed against the first valve port opening by a fluid pressure in the valve chamber that is higher than the fluid pressure in the first valve port opening, to thereby resist fluid flow through the first valve port opening.

13. A valve with a first inlet/outlet and second inlet/outlet configured for fluid flow in either direction; the valve comprising:

a valve chamber having a lower wall with a first valve port opening and a second valve port opening in communication with the first inlet/outlet and the second inlet/outlet of the valve, respectively;

a shaft rotatably disposed in the valve chamber in a generally vertical orientation;

a first valve plate disposed in the valve chamber over the first and second valve port openings and rotatably coupled to the shaft, the first valve plate being configured to be movable in an axial direction towards and away from the first and second valve port openings, said first valve plate having a first tapered semi-circular slot positioned therein so as to align with the first valve port opening, and a second tapered semi-circular slot and cavity positioned therein so as to align with the second valve port opening, where the first valve plate is configured to rotate from a closed position, in which the first valve plate is positioned over the first valve port opening and the cavity is positioned over the second valve port opening, to an open position in which rotation of the first valve plate adjustably positions a wider or narrower portion of the first tapered semi-circular slot over the first valve port opening and a wider or narrower portion of the second tapered semi-circular slot over the second valve port opening, for adjustably varying the fluid flow rate through the valve;

a second valve plate disposed within the cavity in the first valve plate, so as to be positioned over the second valve port opening when the first valve plate is rotated to the closed position, the second valve plate being configured to be movable relative to the first valve plate in an axial direction towards and away from the second valve port opening;

wherein the first valve plate in the closed position is configured to move away from the first valve port opening, and the second valve plate in the closed position is configured to move against the second valve port opening, to thereby resist fluid flow through the second valve port opening; and wherein the second valve plate in the closed position is configured to move away from the second valve port opening, and the first valve plate in the closed position is configured to move against the first valve port opening, to thereby resist fluid flow through the first valve port opening.

14. The valve of claim 13, wherein the first valve plate in the closed position is configured to move away from the first valve port opening by a fluid pressure in the first inlet/outlet and first valve port opening that is higher than the fluid pressure in the second inlet/outlet, to communicate said higher fluid pressure to the valve chamber, and the second valve plate in the closed position is configured to be pushed against the second valve port opening by a fluid pressure in the valve chamber that is higher than the fluid pressure in the second valve port opening, to thereby resist fluid flow through the second valve port opening, and wherein the second valve plate in the closed position is configured to move away from the second valve port opening by a fluid pressure in the second inlet/outlet and second valve port opening that is higher than the fluid pressure in the first inlet/outlet, to communicate said higher fluid pressure to the valve chamber, and the first valve plate in the closed position is configured to be pushed against the first valve port opening by a fluid pressure in the valve chamber that is higher than the fluid pressure in the first valve port opening, to thereby resist fluid flow through the first valve port opening.

15. The valve of claim 13, wherein the first valve plate is a modulating disk having a generally round contour, a central aperture therein having a keyed configuration, a first tapered semi-circular slot therein that is concentric with the central aperture, a second tapered semi-circular slot therein that is concentric with the first tapered semi-circular slot, and a cavity therein.

16. The valve of claim 15, wherein the second valve plate is disposed within the cavity in the first valve plate, and comprises a plate having a generally disk shaped contour and a generally convex-shaped upper surface, said second valve plate being smaller than the cavity of the first valve plate such that the second valve plate is configured to move within the cavity in an axial direction relative to the first valve plate.

17. The valve of claim 16, wherein the shaft is configured to be movable in an axial direction such that the first valve plate coupled to the shaft is movable in a direction towards and away from the first valve port opening.

18. The valve of claim 17, further comprising a first biasing spring for biasing the first valve plate towards the first valve port opening, wherein the first valve plate in the closed position is configured to move away from the first valve port opening against the force of the first biasing spring where a fluid pressure in the first inlet/outlet and first valve port opening is higher than the fluid pressure in the second inlet/outlet.

19. The valve of claim 18, wherein the first valve plate is configured to move away from the first valve port opening to communicate fluid pressure through a first bleed passage to the valve chamber, which fluid pressure pushes the second valve plate into sealing engagement with the second valve port opening and restrict fluid flow through the second valve port opening.

20. The valve of claim 19, wherein the second valve plate is configured to move away from the second valve port opening to communicate fluid pressure through a second bleed passage to the valve chamber, which fluid pressure pushes the first valve plate into sealing engagement with the first valve port opening and restrict fluid flow through the first valve port opening.

* * * * *